United States Patent
Nakano et al.

(10) Patent No.: US 11,836,055 B1
(45) Date of Patent: Dec. 5, 2023

(54) BACKUP MANAGEMENT SYSTEM, MANAGEMENT CALCULATOR, AND NON-TEMPORARY COMPUTER-READABLE RECORDING MEDIUM

(71) Applicant: Hitachi, Ltd., Tokyo (JP)

(72) Inventors: Kaori Nakano, Tokyo (JP); Shinichi Hayashi, Tokyo (JP); Nobuaki Ozaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/114,490

(22) Filed: Feb. 27, 2023

(30) Foreign Application Priority Data

Sep. 28, 2022 (JP) .................... 2022-155080

(51) Int. Cl.
*G06F 11/14* (2006.01)
(52) U.S. Cl.
CPC ...... *G06F 11/1469* (2013.01); *G06F 11/1466* (2013.01)
(58) Field of Classification Search
CPC .................. G06F 11/1469; G06F 11/1466
USPC ......................................... 714/4.11
See application file for complete search history.

(56) References Cited

U.S. PATENT DOCUMENTS

2005/0125467 A1  6/2005  Dosaki et al.
2021/0150383 A1* 5/2021  Lindström .......... G06N 5/04

FOREIGN PATENT DOCUMENTS

WO  2004/053696 A1  6/2004

OTHER PUBLICATIONS

Wikipedia "backup" page, retrieved from https://en.wikipedia.org/wiki/Backup (Year: 2023).*

* cited by examiner

*Primary Examiner* — Yair Leibovich
(74) *Attorney, Agent, or Firm* — MATTINGLY & MALUR, PC

(57) ABSTRACT

An arrangement combination of a backup repository satisfying an arrangement constraint rule is calculated based on business system configuration information related to a configuration of a business system server included in a management target, backup repository configuration information which is information related to a configuration of a repository server for storing the backup data, input backup setting information, and the arrangement constraint rule for determining an arrangement of backup data according to a backup purpose, Estimated are a processing time of predetermined backup for an arrangement of the backup repository and a processing time of predetermined restoration for an arrangement of the backup repository and a restoration purpose. The combination in which the processing times of the backup and the restoration satisfy a target backup completion time and a target restoration processing time included in the input backup setting information is derived among arrangement combinations of the backup repository.

15 Claims, 37 Drawing Sheets

FIG.3

BUSINESS SYSTEM CONFIGURATION INFORMATION

| SERVER ID | DATA ID | DATA CAPACITY (GB) | MAXIMUM NETWORK BANDWIDTH (Gbps) | MAXIMUM DISK TRANSFER BANDWIDTH (MB/s) | MAXIMUM DISK IOPS | ARRANGEMENT |
|---|---|---|---|---|---|---|
| Srv1 | /dev/sda1 | 1000 | 5 | 250 | 8000 | ZoneA/ResionA |
| Srv2 | /dev/sda1 | 500 | 10 | 800 | 10000 | ZoneB/RegionA |
| ... | ... | ... | ... | ... | ... | ... |

FIG.4

BACKUP REPOSITORY CONFIGURATION INFORMATION

| SERVER ID | REPOSITORY ID | REPOSITORY CAPACITY (GB) | FREE CAPACITY(GB) | ARRANGE MENT | MAXIMUM NETWORK BANDWIDTH (Gbps) | MAXIMUM DISK TRANSFER BANDWIDTH (MB/s) | MAXIMUM DISK IOPS |
|---|---|---|---|---|---|---|---|
| Rsrv1 | Rep1 | 20000 | 10000 | ZoneA/RegionA | 10 | 800 | 10000 |
| Rsrv2 | Rep2 | 20000 | 3000 | ZoneB/RegionA | 5 | 250 | 8000 |
| Rsrv3 | Rep3 | 20000 | 15000 | ZoneC/RegionB | 5 | 250 | 8000 |
| Rsrv4 | Rep4 | 20000 | 15000 | ZoneC/RegionB | 5 | 250 | 8000 |
| ... | ... | ... | ... | ... | ... | ... | ... |

FIG.5

ARRANGEMENT CONSTRAINT RULE 113

| | | ARRANGEMENT 501 | 502 | 503 |
|---|---|---|---|---|
| | | SAME ZONE | DIFFERENT ZONES | DIFFERENT REGIONS |
| BACKUP PURPOSE (INPUT) 511 | LOGICAL FAULT | Y | Y | Y |
| | STORAGE FAULT | Y | Y | Y |
| | ZONE FAULT | N | Y | Y |
| | REGION FAULT | N | N | Y |

FIG.6

EXAMPLE OF BACKUP SETTING INPUT SCREEN 11000

BACKUP SETTING INPUT SCREEN

601 BACKUP TARGET SERVER [ Srv1 ]
602 BACKUP TARGET DATA [ /dev/sda ]
603 BACKUP PURPOSE
  ☑ LOGICAL FAULT   ☐ STORAGE FAULT   ☑ ZONE FAULT   ☐ REGION FAULT
604 NUMBER OF BACKUPS [ 2 ]
605 TARGET BACKUP COMPLETION TIME [ 200 ] MINUTES
606 BACKUP SCHEDULE [ EVERY DAY, 22:00 ]
607a TARGET RESTORATION TIME (LOGICAL FAULT) [ 200 ] MINUTES
607b TARGET RESTORATION TIME (ZONE FAULT) [ 200 ] MINUTES
608 BACKUP RETENTION PERIOD [ SEVEN GENERATIONS ]

EXAMPLE OF TRAINED MODEL OF BACKUP
PROCESSING PERFORMANCE CALCULATION PROGRAM

CORRELATION BETWEEN BACKUP DATA CAPACITY AND
BACKUP TIME IN BACKUP IN ZONE

EXAMPLE OF TRAINED MODEL OF BACKUP
PROCESSING PERFORMANCE CALCULATION PROGRAM

CORRELATION BETWEEN BACKUP DATA CAPACITY AND
BACKUP TIME IN BACKUP BETWEEN ZONES

EXAMPLE OF TRAINED MODEL OF RESTORATION
PROCESSING PERFORMANCE CALCULATION PROGRAM

EXAMPLE OF TRAINED MODEL OF RESTORATION
PROCESSING PERFORMANCE CALCULATION PROGRAM

FIG.11A
EXAMPLE OF TRAINED MODEL OF BACKUP
PROCESSING PERFORMANCE CALCULATION PROGRAM
1101 
CORRELATION BETWEEN BACKUP DATA CAPACITY
AND DISK IOPS OF REPOSITORY SERVER IN BACKUP IN ZONE
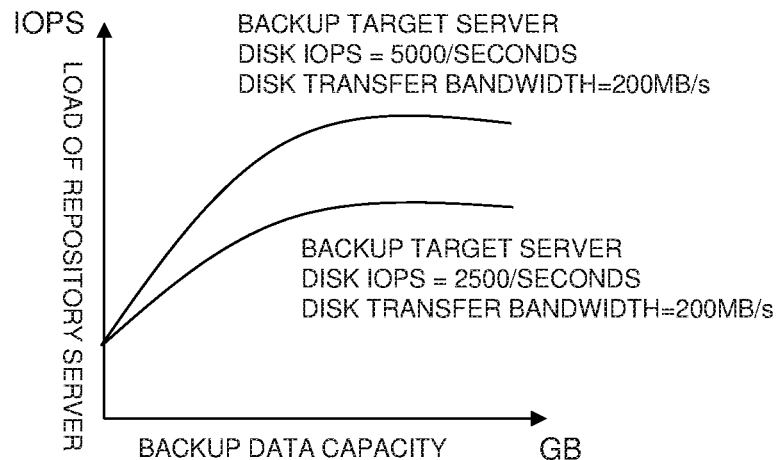

EXAMPLE OF TRAINED MODEL OF BACKUP
PROCESSING PERFORMANCE CALCULATION PROGRAM

CORRELATION BETWEEN BACKUP DATA CAPACITY AND
DISK IOPS OF REPOSITORY SERVER IN BACKUP BETWEEN ZONES

EXAMPLE OF TRAINED MODEL OF BACKUP
PROCESSING PERFORMANCE CALCULATION PROGRAM

CORRELATION BETWEEN BACKUP DATA CAPACITY AND
DISK IOPS OF REPOSITORY SERVER IN BACKUP BETWEEN Region A AND Region B

EXAMPLE OF TRAINED MODEL OF BACKUP
PROCESSING PERFORMANCE CALCULATION PROGRAM

CORRELATION BETWEEN BACKUP DATA CAPACITY AND 1111
DISK TRANSFER BANDWIDTH OF REPOSITORY SERVER IN BACKUP IN ZONE

EXAMPLE OF TRAINED MODEL OF BACKUP
PROCESSING PERFORMANCE CALCULATION PROGRAM

EXAMPLE OF TRAINED MODEL OF BACKUP
PROCESSING PERFORMANCE CALCULATION PROGRAM

CORRELATION BETWEEN BACKUP DATA CAPACITY AND DISK
TRANSFER BANDWIDTH OF REPOSITORY SERVER IN BACKUP BETWEEN Region A AND Region B EXAMPLE OF TRAINED MODEL OF RESTORATION
PROCESSING PERFORMANCE CALCULATION PROGRAM EXAMPLE OF TRAINED MODEL OF RESTORATION
PROCESSING PERFORMANCE CALCULATION PROGRAM CORRELATION BETWEEN BACKUP DATA CAPACITY AND DISK
IOPS OF REPOSITORY SERVER IN RESTORATION BETWEEN Region A AND Region B EXAMPLE OF TRAINED MODEL OF RESTORATION
PROCESSING PERFORMANCE CALCULATION PROGRAM CORRELATION BETWEEN BACKUP DATA CAPACITY AND DISK
TRANSFER BANDWIDTH OF REPOSITORY SERVER IN RESTORATION IN ZONE EXAMPLE OF TRAINED MODEL OF RESTORATION
PROCESSING PERFORMANCE CALCULATION PROGRAM CORRELATION BETWEEN BACKUP DATA CAPACITY AND DISK 1212
TRANSFER BANDWIDTH OF REPOSITORY SERVER IN RESTORATION BETWEEN ZONES EXAMPLE OF TRAINED MODEL OF RESTORATION
PROCESSING PERFORMANCE CALCULATION PROGRAM
1213

FIG.13

ARRANGEMENT PLAN SELECTION SCREEN (12000)

● ARRANGEMENT PLAN 1 (1300a, 1307)

Region A: [BUSINESS SYSTEM, REPOSITORY 1 — Zone A] ①, [REPOSITORY 2 — Zone B] ①

| | |
|---|---|
| 1301 BACKUP DESTINATION | REPOSITORY 1(RegionA, ZoneA) x1, REPOSITORY 2(RegionA, ZoneB) x1 |
| 1302 ADDITIONAL COST | 0 YEN/MONTH |
| 1303 ADDITIONAL RESOURCE | NONE |
| 1304 ESTIMATED BACKUP COMPLETION TIME | 150 MINUTES |
| 1305 ESTIMATED RESTORATION TIME(RTO) | ADDRESSING LOGICAL FAULT: 100 MINUTES<br>ADDRESSING ZONE FAULT: 150 MINUTES |
| 1306 BACKUP FREQUENCY(RPO) | 24 HOURS |

○ ARRANGEMENT PLAN 2 (1300b)

Region A: [BUSINESS SYSTEM — Zone 1], [REPOSITORY 2 — Zone 2] ②

| | |
|---|---|
| BACKUP DESTINATION | REPOSITORY 2(RegionA, ZoneB) x2 |
| ADDITIONAL COST | 20000 YEN/MONTH |
| ADDITIONAL RESOURCE | EXTEND DISK TRANSFER BANDWIDTH OF REPOSITORY 2 |
| ESTIMATED BACKUP COMPLETION TIME | 150 MINUTES |
| ESTIMATED RESTORATION TIME(RTO) | ADDRESSING LOGICAL FAULT: 150 MINUTES<br>ADDRESSING ZONE FAULT: 150 MINUTES |
| BACKUP FREQUENCY(RPO) | 24 HOURS |

○ ARRANGEMENT PLAN 3 (1300c)

Region A: [BUSINESS SYSTEM, REPOSITORY 1 — Zone A] ①; Region B: [REPOSITORY [ADDITIONAL] — Zone C] ①

| | |
|---|---|
| BACKUP DESTINATION | REPOSITORY 2(RegionA, ZoneA) x1, REPOSITORY 3 [ADDITIONAL](RegionB, ZoneC) x1 |
| ADDITIONAL COST | 20000 YEN/MONTH |
| ADDITIONAL RESOURCE | ADD REPOSITORY (Region B, Zone 1) |
| ESTIMATED BACKUP COMPLETION TIME | 200 MINUTES |
| ESTIMATED RESTORATION TIME(RTO) | ADDRESSING LOGICAL FAULT: 100 MINUTES<br>ADDRESSING ZONE FAULT: 200 MINUTES |
| BACKUP FREQUENCY(RPO) | 24 HOURS |

1311 [ JOB REGISTRATION ]

FIG.14

BACKUP JOB INFORMATION

| JOB ID 1401 | SOURCE 1402 | | BACKUP REPOSITORY 1404 | SCHEDULE 1405 | ESTIMATED BACKUP COMPLETION TIME 1406 | BACKUP PURPOSE 1407 | ESTIMATED RESTORATION TIME 1408 |
|---|---|---|---|---|---|---|---|
| | SERVER ID | DATA ID 1403 | | | | | |
| Job1 | Srv1 | /dev/sda1 | Rep1 | EVERY DAY, 22:00 | 100 MINUTES | LOGICAL FAULT | LOGICAL FAULT: 100 MINUTES |
| Job2 | Srv1 | /dev/sda1 | Rep2 | EVERY DAY, 22:00 | 150 MINUTES | LOGICAL FAULT, ZONE FAULT | LOGICAL FAULT: 150 MINUTES, ZONE FAULT: 100 MINUTES |
| | | | | | | | |

121

BACKUP REPOSITORY CONFIGURATION CHANGE PROGRAM

BACKUP JOB REGISTRATION PROGRAM

FIG.16

BACKUP DATA INFORMATION

| BACKUP DATA ID | SOURCE | | BACKUP REPOSITORY | BACKUP PURPOSE | ESTIMATED RESTORATION TIME | BACKUP TIME |
|---|---|---|---|---|---|---|
| | SERVER ID | DATA ID | | | | |
| Bdata1 | Srv1 | /dev/sda1 | Rep1 | LOGICAL FAULT | LOGICAL FAULT: 100 MINUTES | 2022/01/02,0:20 |
| Bdata2 | Srv1 | /dev/sda1 | Rep2 | LOGICAL FAULT, ZONE FAULT | LOGICAL FAULT: 150 MINUTES, ZONE FAULT: 100 MINUTES | 2022/01/02,1:00 |
| | | | | | | |

FIG.18

EXAMPLE OF INPUT SCREEN                                          11001

| BACKUP SETTING INPUT SCREEN |

1801  TOTAL DATA CAPACITY  [10TB]
1802  NUMBER OF BACKUP TARGET SERVERS  [2]
1803  ASSUMED BUSINESS SYSTEM DISK IOPS  [3000/SECONDS]
1804  ASSUMED BUSINESS SYSTEM DISK TRANSFER BANDWIDTH  [250MB/s]

603  BACKUP PURPOSE
　　　☑ LOGICAL FAULT　　☐ STORAGE FAULT　　☑ ZONE FAULT　　☐ REGION FAULT

604  NUMBER OF BACKUPS  [2]

605  TARGET BACKUP COMPLETION TIME  [200] MINUTES

606  BACKUP SCHEDULE  [EVERY DAY, 22:00]

607a  TARGET RESTORATION TIME (LOGICAL FAULT)  [200] MINUTES
607b  TARGET RESTORATION TIME (ZONE FAULT)  [200] MINUTES

608  BACKUP RETENTION PERIOD  [SEVEN GENERATIONS]

FIG.19

```
┌─────────────────────────────────────────────────────────────────┐
│              RESTORATION EXECUTION SCREEN 13000a                │
│                                                                 │
│ 1901   RESTORATION                                              │
│        TARGET SERVER      [ Srv1    ]                           │
│ 1902   RESTORATION                                              │
│        TARGET DATA        [ /dev/sda ]                          │
│ 1903   RESTORATION PURPOSE                                      │
│         ○ LOGICAL    ○ STORAGE    ● ZONE    ○ REGION            │
│           FAULT        FAULT        FAULT     FAULT             │
│                                               1904  [ NEXT ]    │
└─────────────────────────────────────────────────────────────────┘
```

FIG.21

RESTORATION EXECUTION SCREEN 13000b

| | # | BACKUP TIME | REPOSITORY | ESTIMATED RESTORATION TIME |
|---|---|---|---|---|
| ○ | 1 | 2022/03/01, 22:00 | Rep1 | 100MINUTES |
| ○ | 2 | 2022/03/02, 22:00 | Rep1 | 100MINUTES |
| ⦿ | 3 | 2022/03/03, 22:00 | Rep1 | 100MINUTES |

RESTORATION EXECUTION

BACKUP MANAGEMENT SYSTEM, MANAGEMENT CALCULATOR, AND NON-TEMPORARY COMPUTER-READABLE RECORDING MEDIUM

CROSS-REFERENCE TO RELATED APPLICATION

The present application claims priority from Japanese application JP2022-155080, filed on Sep. 28, 2022, the contents of which is hereby incorporated by reference into this application.

BACKGROUND OF THE INVENTION

1. Field of the Invention

The present invention relates to a backup management system, a management calculator, and a non-temporary computer-readable recording medium.

2. Description of the Related Art

In recent years, in a field of IT (Information Technology), there has been known server virtualization technology in which calculational resources of one calculator are divided into a plurality of virtual calculators (virtual machines (VMs)) and used from a perspective of effectively utilizing resources of a calculator system.

In addition, there are increasing cases of using a public cloud instead of constructing an IT system in a data center (on-premise) owned by one company. A typical public cloud is a service in which a data center operator pools calculational resources such as a server, a disk (also referred to as a storage), and a network, and divides and provides the calculational resources for each user using virtualization technology. In a public cloud, pay-as-you-go based on performance of used calculational resources (the size of calculational resource such as the number of CPU cores of a server and quality such as a type of disk) and a usage time is common.

In management of the IT system, in preparation for occurrence of an abnormality in data processed by the IT system, or occurrence of a failure in equipment or software included in the IT system, data processed by the IT system is backed up in many cases. A plurality of storage destinations for the backup data may be prepared according to a backup purpose and availability required for the IT system.

As such technology, for example, there is technology described in WO 2004/053696 A.

WO 2004/053696 A discloses technology for determining a storage destination of backup data based on a requirement that backup data be stored in a geographically distant location as much as possible for disaster countermeasures.

SUMMARY OF THE INVENTION

While there is conventional technology for determining backup job setting based on backup or restoration requirements as in WO 2004/053696 A, when a backup system is constructed, it has become possible to immediately construct a configuration of the backup system, starting from a small scale, using virtualization technology and a public cloud. Therefore, when the system is constructed, cost effectiveness is improved by taking a small configuration at an initial stage and increasing the scale of the backup system when data capacity needed to be backed up increases or change for improving availability of the system by backup is made.

For this reason, when constructing a backup system, or adding or changing a backup execution process (hereinafter referred to as a backup job in some cases), it is necessary to design a cost-effective backup configuration reducing a scale of a backup data storage destination and the backup data storage destination while constraining a backup requirement of each IT system.

The invention has been made in view of the above circumstances, and an object of the invention is to provide technology capable of designing a cost-effective backup configuration reducing a scale of a backup data storage destination and the backup data storage destination while constraining a backup requirement of an IT system.

To achieve the above object, a backup management system related to an aspect is configured as a backup management system for managing backup data by executing backup and restoration of a management target using a computer having a processor and a memory, in which the processor calculates an arrangement combination of a backup repository satisfying an arrangement constraint rule based on business system configuration information which is information related to a configuration of a business system server included in the management target, backup repository configuration information which is information related to a configuration of a repository server for storing the backup data, input backup setting information, and the arrangement constraint rule for determining an arrangement of backup data according to a backup purpose, estimates a processing time of predetermined backup for an arrangement of the backup repository, estimates a processing time of predetermined restoration for an arrangement of the backup repository and a restoration purpose, and derives the combination in which the processing time of the backup and the processing time of the restoration satisfy a target backup completion time and a target restoration processing time included in the input backup setting information among arrangement combinations of the backup repository.

According to the invention, it is possible to design a cost-effective backup configuration reducing a scale of a backup data storage destination and the backup data storage destination while constraining a backup requirement of an IT system.

BRIEF DESCRIPTION OF THE DRAWINGS

FIG. 3 is a configuration diagram of a table of business system configuration information according to the first embodiment;

FIG. 4 is a configuration diagram of a table of backup repository configuration information according to the first embodiment;

FIG. 5 is a configuration diagram of a table of an arrangement constraint rule according to the first embodiment;

FIG. 6 is a diagram illustrating an example of a backup setting input screen according to the first embodiment;

FIG. 11A is a diagram illustrating an example of trained model of the backup processing calculation program according to the first embodiment;

FIG. 13 is a diagram illustrating an example of an arrangement plan selection screen according to the first embodiment;

FIG. 14 is a configuration diagram of a table of backup job information according to the first embodiment;

FIG. 16 is a configuration diagram of a table of backup data information according to the first embodiment;

FIG. 18 is a diagram illustrating an example of a backup setting input screen according to a third embodiment;

FIG. 19 is a diagram illustrating an example of a restoration execution screen according to a fourth embodiment;

FIG. 21 is a diagram illustrating an example of a restoration execution screen according to the fourth embodiment.

DETAILED DESCRIPTION OF THE PREFERRED EMBODIMENTS

Figure 1:
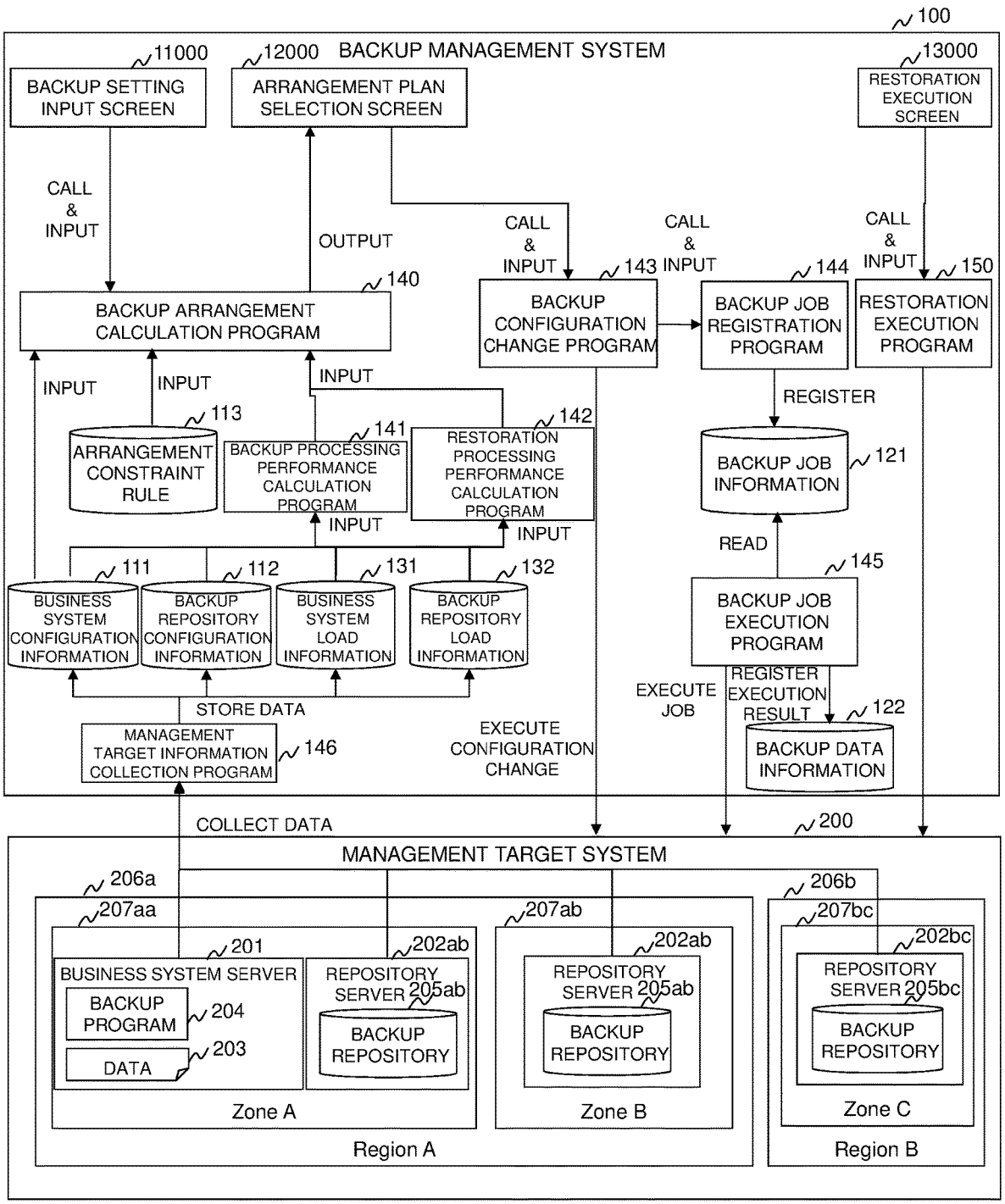
FIG. 1 is a logical overall configuration diagram of a backup management system according to a first embodiment.

In the following description of the invention, reference will be made to the accompanying drawings, which form a part of the disclosure. However, these drawings illustrate illustrative embodiments in which the invention can be implemented and do not limit the invention. In these drawings, the same reference numerals indicate the same components throughout the drawings. Furthermore, even though the detailed description provides various illustrative embodiments, as described and illustrated below, the invention is not limited to the embodiments described and illustrated in the specification, and those skilled in the art should note that extension to other embodiments known or to be known in the future is possible. Unless otherwise specified, each component may be singular or plural. A position, size, shape, range, etc. of each component illustrated in the drawings do represent an actual position, size, shape, range, etc., in order to facilitate understanding of the invention in some cases. For this reason, the invention is not necessarily limited to the position, size, shape, range, etc., disclosed in the drawings.

Moreover, in the following description, numerous specific details are set forth in order to provide a thorough understanding of the invention. However, it will be apparent to those skilled in the art that not all these specific details are required to implement the invention. In other situations, well-known structures, materials, circuits, processes, and interfaces may not be described in detail and/or may be illustrated in the form of a block diagram so as not to unnecessarily obscure the invention.

In addition, in description below, processing may be described using a "program" as a subject of action. However, the program performs designated processing while appropriately using a storage device (for example, a memory) and/or an interface device by being executed by a processor (for example, a CPU (Central Processing Unit)). Therefore, a subject of processing may be the processor (or a device or system having the processor). In addition, the processor may include a hardware circuit that performs part or all of the processing, and a subject of the processing performed by executing the program may be a controller, a device, a system, a calculator, or a node having the processor. A subject of the processing performed by executing the program may be an arithmetic program, and may include a dedicated circuit (for example, an FPGA (Field-Programmable Gate Array) or an ASIC (Application Specific Integrated Circuit)) that performs specific processing.

A program may be installed on a device, such as a calculator, from a program source. The program source may be, for example, a program distribution server or a computer-readable storage medium. Further, in the following description, two or more programs may be implemented as one program, and one program may be implemented as two or more programs.

Further, in the following description, the terms calculator, server, and computer may be physical computers, or virtual machines or containers obtained by virtually dividing a physical computer using virtualization technology, etc. A service related to this system can be provided by one or a plurality of calculators, servers, computers, virtual machines, or containers executing one or a plurality of programs. Users of this system will be able to effectively utilize hardware resources and reduce costs by receiving this service.

In addition, in the following description, when the same types of elements are distinguished and described, reference numerals of the elements are used, and when the same types of elements are described without distinguishment, a common parent sign among reference numerals of the elements may be used. For example, when repository servers are described without particular distinguishment, the repository servers may be described as a repository server 202, and when the individual repository servers are distinguished and described, the repository servers may be described as repository servers 202aa and 202ab.

In addition, a physical or virtual calculator, network, storage, OS (Operating System), middleware, etc. included in an IT system may be collectively referred to as IT infrastructure.

Further, in the following description, information may be described using an expression of "AAA-table". However, the information may be expressed as any data structure. That is, the "AAA-table" may be referred to as "AAA-information" to indicate that the information is independent of the data structure. Further, when identification information is described, and expressions such as "identification information", "identifier", "name", "ID", and "number" are used, these expressions can be mutually substituted.

First Embodiment

FIG. 1 is a logical overall configuration diagram of a backup management system according to a first embodiment.

The backup management system 100 is an example of a management system, and manages a management target system 200 including an IT system designated by a system administrator and a backup system having a function of backing up and restoring data of the IT system.

The management target system 200 is an example of an IT system and a backup system, and includes one or more business system servers 201 that execute business and one or more repository servers 202 that store backup data of data processed by the business system server.

The business system server 201 has data 203 stored in a storage device, etc. and a backup program 204. The data 203 is processed or stored in the business system server 201 to execute business. The backup program 204 is a program that executes a process of copying and storing the data 203 in the repository server 202 as backup data, or restores the backup data to a designated server according to an instruction from the system administrator. The backup program 204 not only copies the data 203, but may also perform data processing such as compression processing to reduce data capacity or division of data to increase transfer efficiency. In the present embodiment, a configuration in which the business system server 201 has the backup program is taken as an example. However, it is possible to adopt a configuration in which the backup program runs on a server different from the business system server 201 and performs backup and restoration processing of the data 203 via a network. In addition, it is possible to adopt a configuration in which the backup program runs on the business system server 201, another server, or both the servers, and collectively executes and manages backup and restoration of the plurality of business system servers 201.

The repository server 202 has a backup repository 205. The backup repository 205 is a storage device of the repository server 202 in which the data 203 is copied as backup data and stored by the backup program 204.

For example, the business system server 201 and the backup repository 202 are connected via a network 170 (see FIG. 2), and the backup program 204 transfers the data 203 to the repository server 202 via the network 170, and stores the data 203 in the backup repository 205. During execution of restoration processing, the backup program 204 copies the backup data stored in the backup repository 205 via the network 170 and transfers the backup data to the designated business system server 201.

The management target system 200 has IT infrastructure (for example, server including the business system server 201 or the repository server 202) in one or a plurality of areas and sections. A section where data centers in which IT infrastructure is installed are geographically clustered is defined as a region 206. In addition, a set of one or a plurality of data centers in the region 206, which is autonomous physically and in terms of software, is defined as a zone 207. The region 206 and the zone 207 are connected by the network 170 and data can be transferred therebetween. Therefore, even though data transfer is possible between zones and between regions, if equipment or software operated and used independently in each zone or region fails, a fault does not spread to other zones or regions.

The backup management system 100 has, as data, business system configuration information 111, backup repository configuration information 112, an arrangement constraint rule 113, backup job information 121, and backup data information 122. In addition, business system load information 131, backup repository load information 132, and backup data information 122 are included to execute processing of second, third, and fourth embodiments.

Configuration information of IT infrastructure of the business system server 201 is stored as the business system configuration information 111. Configuration information of IT infrastructure of the repository server 202 is stored as the backup repository configuration information 112. A rule defining whether backup data can be arranged in the same zone, different zones, or different regions for the backup purpose input by the system administrator is stored as the arrangement constraint rule 113. Setting information of a backup job set by the system administrator is stored as the backup job information 121. A result of backup processing executed by the backup program 204 is stored as the backup data information 122.

Time-series data of a load of IT infrastructure included in the business system server 201 (for example, a CPU usage rate, a disk transfer bandwidth usage rate, a disk IC amount, and a network I/F usage bandwidth) is stored as the business system load information 131 processed in a second embodiment. Time-series data of a load of IT infrastructure included in the repository server 202 (for example, a CPU usage rate, a disk transfer bandwidth usage rate, a disk IC amount, and a network I/F usage bandwidth) is stored as the backup repository load information 132 processed in the second embodiment.

Information collected from the management target system 200 via the network 170 by a management target information collection program 146 is stored as the business system configuration information 111, the backup repository configuration information 112, the business system load information 131, and the backup repository load information 132. The information may be updated periodically, when the configuration of the management target system 200 is updated, or at any time.

Next, an outline of processing of the backup management system 100 of the first embodiment will be described.

When the system administrator inputs setting information related to a backup job of the data 203 of the business system server 201 from a backup setting input screen 11000, the backup management system 100 starts and executes a backup arrangement calculation program 140. The backup arrangement calculation program 140 (more precisely, a processor 161 (see FIG. 2) of a management calculator 160 that executes the backup arrangement calculation program 140) derives, as a backup data storage destination, all repository servers 202 satisfying a backup requirement or a combination of one program (including the case where one repository server 202 is present) based on a backup purpose, the number of backups, the region 206 and the zone 207 of the business system server 201 to be backed up, and the arrangement constraint rule 113 designated on the backup setting input screen 11000. Next, a combination of repository servers 202 satisfying a target backup completion time and a target restoration time designated on the backup setting input screen 11000 is narrowed down based on a backup job completion time and a restoration processing time estimated by a backup processing performance calculation program 141 and a restoration processing performance calculation program 142. Next, for the narrowed down combination of repository servers 202, it is determined whether or not resources of IT infrastructure are need to be added to the repository servers, and when the addition is needed, a necessary additional resource and costs incurred by the addition are calculated. Then, the backup arrangement calculation program 140 displays the combination of repository servers 202 on an arrangement plan selection screen 12000. For each combination of repository servers 202, additional cost, the number of repository servers, an estimated backup completion time, and an estimated restoration time may be displayed on the arrangement plan selection screen 12000. In this way, the system administrator can determine a cost-effective backup data storage destination.

When the system administrator selects a combination of repository servers 202 from the arrangement plan selection screen 12000 and completes backup job setting, a backup configuration change program 143 is started. The backup configuration change program 143 executes configuration change processing for adding an additional resource derived by the backup arrangement calculation program 140 to the management target system 200.

In addition, the backup configuration change program 143 starts a backup job registration program 144. The backup job registration program 144 registers setting information of a backup job in the backup job information 121 from information input on the backup setting input screen 11000 and the arrangement plan selection screen 12000. A backup execution program 145 executes a backup job using a backup start time registered in the backup job information 121 as a trigger, and registers an execution result in the backup data information 122.

Note that a restoration execution program 150 and a restoration execution screen 13000 will be described in a third embodiment.

According to the backup management system 100, a combination of repository servers 202 is derived based on a backup purpose, availability, and a backup completion time/restoration processing time. In addition, information indicating a cost-effective combination is displayed. A backup system configuration is changed as necessary. In this way, it is possible to realize construction of a cost-effective backup system and backup job setting.

A more specific configuration of the backup management system 100 will be described.

Figure 2:
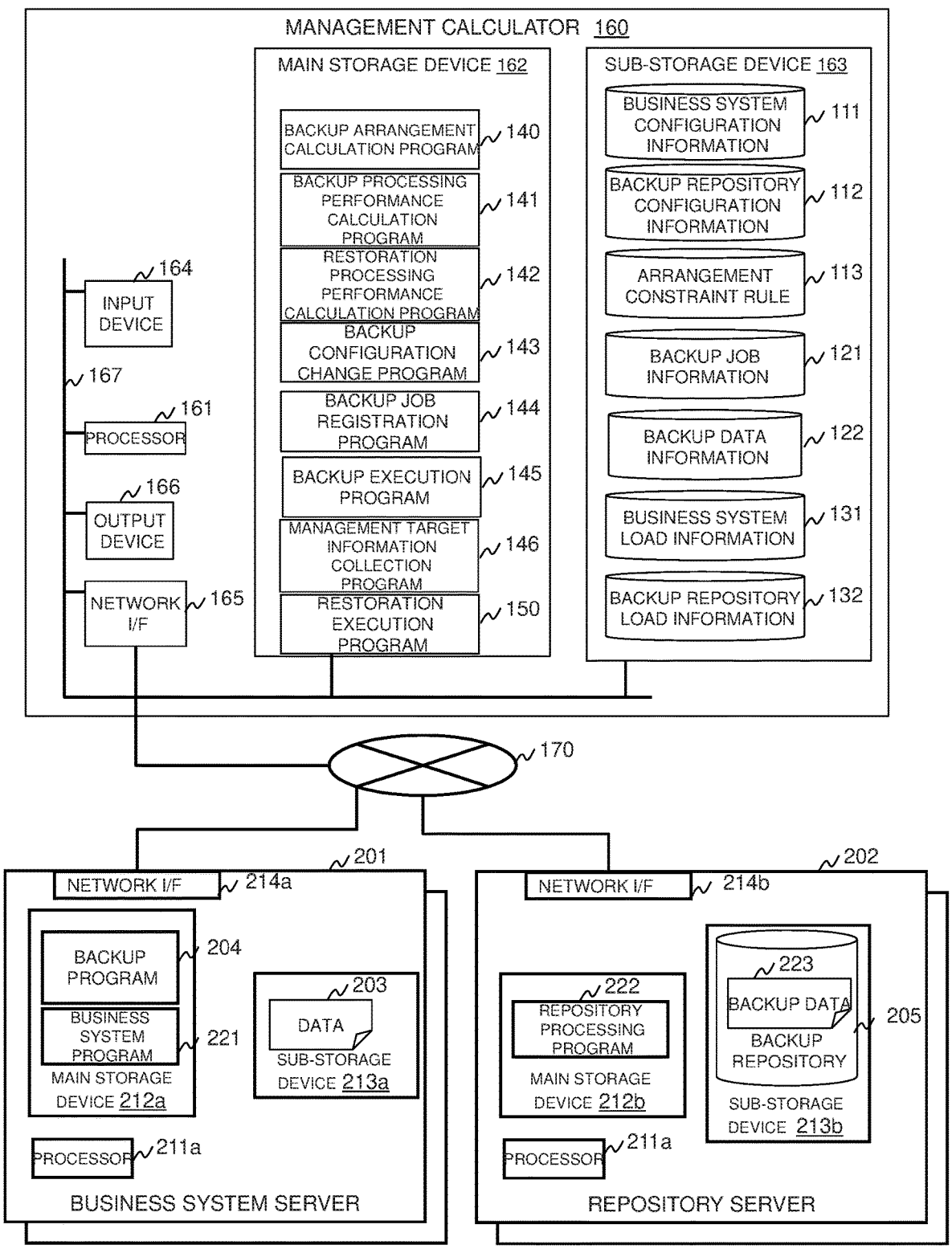
FIG. 2 is an overall configuration diagram including a physical configuration of the backup management system according to the first embodiment.

FIG. 2 is an overall configuration diagram including physical configurations of the backup management system 100 and the management target system 200 according to the first embodiment.

The management calculator 160 included in the backup management system 100 is configured as, for example, a general-purpose calculator, and includes a processor 161 as an example of a processor, a main storage device 162, a sub-storage device 163, an input device 164, a network interface device (network I/F) 165, and an output device 166. These devices are connected via a system bus 167. Note that the management calculator 160 may include a plurality of computers, and distribution and integration are optional according to processing efficiency, etc.

The processor 161 executes various processes according to programs stored in the main storage device 162 and/or the sub-storage device 163.

The sub-storage device 163 is an example of a storage device, and is, for example, a nonvolatile storage device such as an HDD (Hard Disk Drive) or an SSD (Solid State Drive). The sub-storage device 163 has the business system configuration information 111, the backup repository configuration information 112, the arrangement constraint rule 113, the backup job information 121, the backup data information 122, the business system load information 131, and the backup repository load information 132. Note that at least one of these pieces of information may be included in another appropriate storage section that can be referred to by the processor 161.

The main storage device 162 is an example of a storage device, for example, a RAM (Random Access Memory), and stores a program to be executed by the processor 161 or necessary information. The main storage device 162 stores the backup arrangement calculation program 140, the backup processing performance calculation program 141, the restoration processing performance calculation program 142, the backup configuration change program 143, the backup job registration program 144, the management target information collection program 146, and the restoration execution program 150. At least one of these programs may be stored in another appropriate storage section that can be referenced by processor 161. In addition, each program may be stored in a computer-readable non-volatile recording medium, read by a reading device, or acquired from an external device via the network I/F 165.

The network I/F 165 communicates with other devices (the business system server 201 and the repository server 202) via the network 170. For example, the network I/F 165 receives various types of information such as configuration information and load information from devices managed by the backup management system 100 such as the business system server 201 and the repository server 202. In addition, the network I/F 165 transmits instruction information to the backup program 204.

The output device 167 is, for example, a device such as a display or a printer, and outputs (typically displays) various types of information derived by each program or stored in the sub-storage device 163. The input device 164 is, for example, a device such as a keyboard or a pointer device, and receives instruction input of a user.

The management target system 200 has one or more business system servers 201 and one or more repository servers 202. The business system server 201 and the repository server 202 are connected via the network 170 so that communication can be performed.

For example, the business system server 201 and the repository server 202 are general-purpose calculators, and each includes a processor 211, a main storage device 212, a sub-storage device 213, and a network I/F 214. The processor 211 executes various processes according to programs stored in the main storage device 212 and/or the sub-storage device 213. The main storage device 212 is, for example, a RAM, and stores a program executed by the processor 211 or necessary information. The network I/F 214 communicates with other devices via the network 170.

The main storage device 212a of the business system server 201 stores a business system program 221 that executes processing for business, and the backup program 204 that executes backup and restoration processing of the data 203. In addition, the sub-storage device 213a stores the data 203 processed by the business system program 221. For example, the business system server 201 has a function of transmitting configuration information, load information, etc. of the business system server 201 via the network 170 when requested by the backup management system 100.

The main storage device 212 of the repository server 202 stores a repository processing program 222 for processing and storing backup data as a repository. In addition, the sub-storage device 213b is a device included in the backup repository 205 that stores backup data 223 obtained by the backup program 204 copying and storing the data 203. For example, the repository server 202 has a function of transmitting configuration information, load information, etc. of the repository server 202 via the network 170 when requested by the backup management system 100.

<Business System Configuration Information 111>

FIG. 3 is a configuration diagram of a table of the business system configuration information 111 according to the first embodiment.

Information related to a configuration of IT infrastructure included in the business system server 201 is stored as the business system configuration information 111. The business system configuration information 111 includes fields of a server ID 301, a data ID 302, a data capacity 303, a maximum network bandwidth 304, a maximum disk transfer bandwidth 305, maximum disk IOPS 306, and an arrangement 307. One entry is present for each piece of the data 203 of the business system server 201. For example, in the present embodiment, a backup in units of volumes obtained by logically dividing the sub-storage device 213 will be described as an example. For this reason, one entry is present for the volume of the business system server 201. Note that the fields included in the entry are not limited to those described above. Any of the fields described above does not have to be included, and other fields may be included.

A value that uniquely identifies the business system server 201 is stored in the server ID 301. A value that uniquely identifies the data 203 of the business system server 201 to be backed up is stored in the data ID 302. A value of capacity of data to be backed up is stored in the data capacity 303. A value of a maximum bandwidth of the network I/F 214a of the business system server 201 used during backup and restoration processing is stored in the maximum network bandwidth 304. A maximum transfer speed of the sub-storage device 213 that stores the data 203 or the volume obtained by logical division thereof is stored in the maximum disk transfer bandwidth 305. A maximum transaction speed of the sub-storage device 213 that stores the data 203 or the volume obtained by logical division thereof is stored in the maximum disk IOPS 306. A value that uniquely identifies a region and a zone in which the business system server 201 is arranged is stored in the arrangement 307.

<Backup Repository Configuration Information 112>

FIG. 4 is a configuration diagram of a table of the backup repository configuration information 112 according to the first embodiment.

Information related to a configuration of IT infrastructure included in the repository server 202 is stored as the backup repository configuration information 112. The backup repository configuration information 112 includes fields of a server ID 401, a repository ID 402, a repository capacity 403, a free capacity 404, an arrangement 405, a maximum network bandwidth 406, a maximum disk transfer bandwidth 407, and maximum disk IOPS 408. One entry is present for the backup repository 205 of the repository server 202. Note that the fields included in the entry are not limited to those described above. Any of the fields described above does not have to be included, and other fields may be included.

A value that uniquely identifies the repository server 202 is stored in the server ID 401. A value that uniquely identifies the backup repository 205 is stored in the repository ID 402. A value of maximum capacity of data that can be stored in the backup repository 205 is stored in the repository capacity 403. A value of a current free capacity of the backup repository 205 is stored in the free capacity 404. A value that uniquely identifies a region and a zone in which the repository server 202 is arranged is stored in the arrangement 405. A value of a maximum bandwidth of the network I/F 214b of the repository server 202 used during backup and restoration processing is stored in the maximum network bandwidth 406. A maximum transfer speed of the backup repository 205 that stores the backup data 223 is stored in the maximum disk transfer bandwidth 407. A maximum transaction speed of the backup repository 205 that stores the backup data 223 is stored in the maximum disk IOPS 408.

<Arrangement Rule 113>

FIG. 5 is configuration diagram of a table of the arrangement constraint rule 113 according to the first embodiment.

The arrangement constraint rule 113 is information for managing an arrangement rule of the repository server serving as a storage destination of the backup data 223 for the purpose of backing up the data 203 designated by the system administrator. The arrangement constraint rule 113 includes fields of same zone 501, different zones 502, and different regions 503. One entry is present for each type of backup purpose. Note that the fields included in the entry are not limited to those described above. Any of the fields described above does not have to be included, and other fields may be included.

A value for determining whether or not backup data can be arranged in the same zone for the backup purpose is stored in the same zone 501. A value for determining whether or not backup data can be arranged in the same region and different zones for the backup purpose is stored in the different zones 502. A value for determining whether or not backup data can be arranged in different regions for the backup purpose is stored in the different regions 503. In the present embodiment, each field stores an identifier of "Y" when arrangement is possible, and an identifier of "N" when arrangement is not possible.

For example, an entry 511 indicates that, when the system administrator inputs "zone fault" as the purpose of the backup of the data 203 (see FIG. 6 for an input screen), the backup data cannot be stored in the repository server 202 in the same zone. On the other hand, the entry 511 indicates that storage is possible in different zones in the same region or in the repository server 202 in different regions.

<Backup Setting Input Screen>

FIG. 6 is a diagram illustrating an example of a backup setting input screen according to the first embodiment. The input screen in FIG. 6 illustrates an example of the case of implementation using a GUI (Graphical User Interface).

The backup setting input screen 11000 in the first embodiment is an input screen for the system administrator to input information necessary for executing a backup job. The backup setting input screen has a backup target server 601, backup target data 602, a backup purpose 603, the number of backups 604, a target backup completion time 605, a backup schedule 606, a target restoration time 607, and a backup retention period 608. The backup target server 601 is a section that defines the business system server 201 that is the target of data backup. The backup target data 602 is a section that defines the data 203 of the business system server 201 to be backed up. The backup purpose 603 is a section that defines the use of backup data. A value defined in the backup purpose 603 is equivalent to a value stored in the entry 511 of the arrangement constraint rule 113, and a plurality of values may be selected for the value. The number of backups 604 is a section that defines the number of pieces of backup data when storing a plurality of pieces of backup data at the same time in order to improve availability of backup data. The target backup completion time 605 is a section that defines a target value for a time from the start to the end of the backup job. The backup schedule 606 is a section that defines the frequency and time of execution of backup jobs. The target restoration time 607 is a section that defines a target value for a time from the start to the end of restoration. The target restoration time may be defined for each value designated in the backup purpose 603, or one target restoration time may be defined for a backup job. The backup retention period 608 defines a period during which the stored backup data is kept stored. In the present embodiment, the number of generations (the number of pieces of backup data to be stored in order from the latest piece of backup data) is defined. However, for example, a period such as "three months" may be designated, and any one can be selected.

For example, a backup job information input screen of FIG. 6 indicates that an execution target of the backup job is data/dev/sda of a server Srv1, a backup purpose is to address a logical fault and a zone fault, two pieces of backup data are stored when one backup job is executed, a target value for the backup completion time is 200 minutes, the backup job execution frequency is every day at 22:00, a target value for the restoration processing time is 200 minutes, and backup data is stored from the latest data to seven generations ago. In this way, on the backup setting input screen, backup setting information, which is information related to backup setting, is input.

Next, a processing operation in the backup management system 100 will be described in detail.

<Backup Arrangement Calculation Program>

The backup arrangement calculation program 140 is a process performed by being executed by the processor 161 of the management calculator 160, and is a process of calculating the repository server 202 that can store backup target data designated by the system administrator based on restrictions and priorities.

Figure 7:
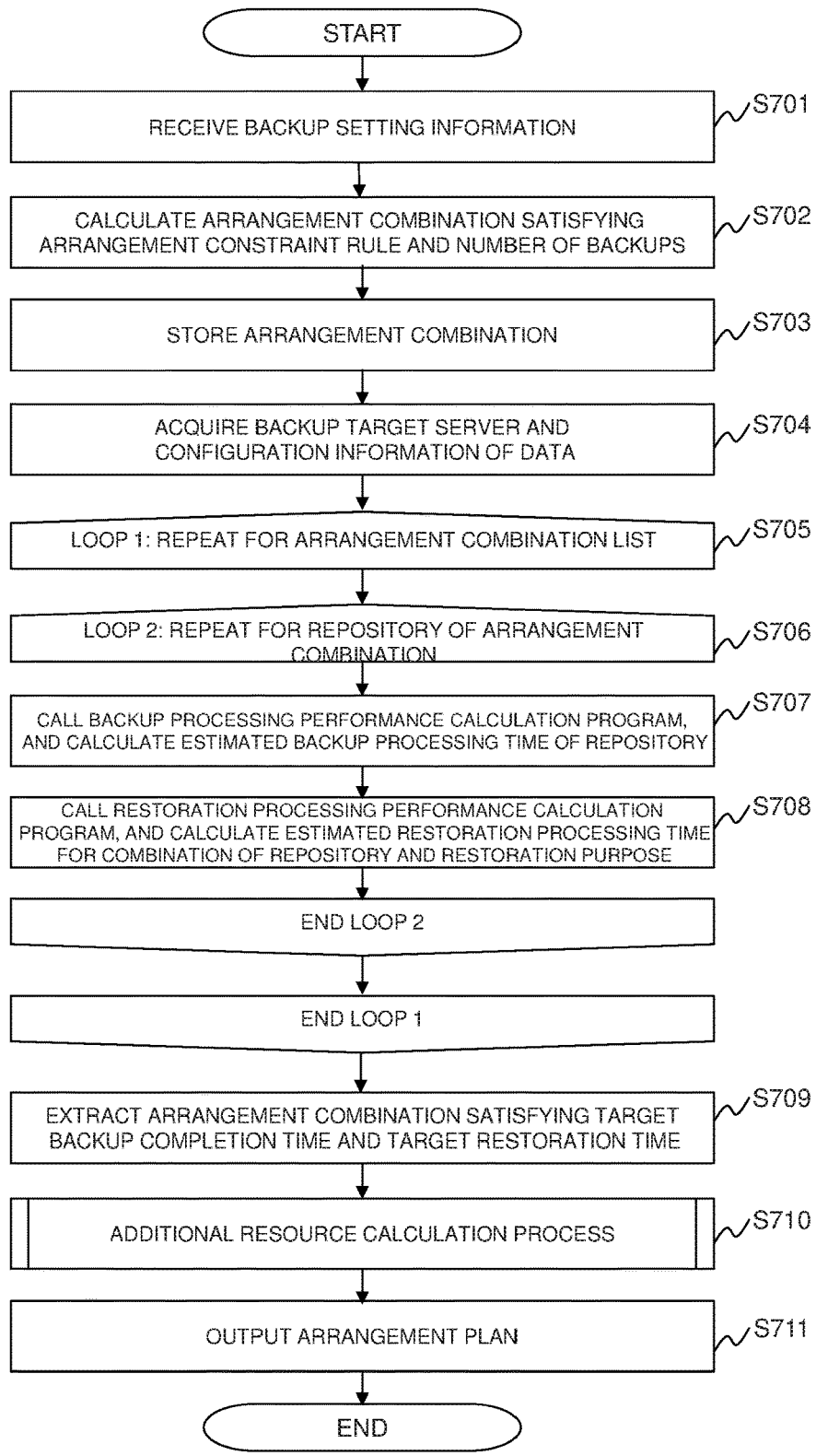
FIG. 7 is a flowchart of a backup arrangement calculation program according to the first embodiment.

FIG. 7 is a flowchart of a backup arrangement calculation process according to the first embodiment.

For example, the backup arrangement calculation program 140 starts processing when it is detected that setting of a new backup job has been registered by the backup setting input screen 11000.

In step S701, the backup arrangement calculation program 140 (more precisely, the processor 161 executing the backup arrangement calculation program 140) receives backup setting information. For example, the backup setting information may be a value input on the backup information input screen 11000.

In step S702, the backup arrangement calculation program 140 calculates an arrangement combination of backup data based on the arrangement constraint rule 113 from values of the backup purpose 603 and the number of backups 604 received. For example, as illustrated in FIG. 6, when the backup purpose is "logical fault" and "zone fault", and the number of backups is "2", an arrangement that satisfies both "logical fault" and "zone fault" in the arrangement rule 113 is different zones and different regions, and three combinations of an arrangement in which each piece of backup data is stored in two repository servers 202 in a zone 207ab, an arrangement in which each piece of backup data is stored in two repository servers 202 in a zone 207bc, and an arrangement in which each piece of backup data is stored in the repository server 202 in each of the zone 207ab and the zone 207bc are derived as an arrangement combination in which two pieces of backup data satisfy "logical fault" and "zone fault". In addition, even though availability of backup data is reduced, an arrangement in which each piece of backup data is stored in the repository server 202 in each of a zone 207aa and the zone 207ab and an arrangement in which each piece of backup data is stored in the repository server 202 in each of the zone 207aa and the zone 207bc may be collectively derived as a combination in which at least one piece of backup data satisfies the arrangement constraint rule 113.

In step S703, the backup arrangement calculation program 140 stores a list of combinations of arrangements derived in step S703. For example, the list of combinations of arrangements may be stored in the main storage device 162.

In step S704, the backup arrangement calculation program 140 acquires an entry from the business system configuration information 111 based on a server ID and a data ID designated by the backup target server 601.

In step S705, the backup arrangement calculation program 140 repeats processing of loop 1 (steps S707 and S708) with the arrangement combination of step S703 as a processing target.

In step S706, the backup arrangement calculation program 140 repeats processing of loop 2 (steps S707 and S708) with the backup repository 205 included in the arrangement combination as a processing target.

In step S707, the backup arrangement calculation program 140 calls the backup processing performance calculation program 141, and uses configuration information of backup target data to estimate a backup completion time of the backup target data for the backup repository 205. For example, the backup processing performance calculation program 141 learns correlations indicated by graphs 901, 902, and 903 of FIGS. 9A, 9B, and 9C, and executes a process of estimating a backup completion time in each arrangement from the disk transfer bandwidth 305, the maximum disk IOPS, and the data capacity 303 of the data 203 of the business system server 201. The graph 901 of FIG. 9A indicates the correlation when the business system server 201 and the repository server 202 are in the same zone, the graph 902 of FIG. 9B indicates the correlation when the business system server 201 and the repository server 202 are in the same region and in different zones, and the graph 903 of FIG. 9C indicates the correlation when the business system server 201 and the repository server 202 are in region A and region B, respectively. When the transfer bandwidth and characteristics of the network differ for each zone, a correlation may be learned for each combination of zones.

Estimation of the backup completion time in the present embodiment is based on the assumption that the disk IOPS and the disk transfer bandwidth of the business system server 201, or the transfer bandwidth of the network between regions becomes a bottleneck, and these are different depending on the characteristics of the backup program 204 and the IT infrastructure included in the management target system 200. For example, it is possible to learn a correlation including parameters such as the maximum network bandwidth 304 of the business system server 201, processor performance, and the number of processors.

In addition, in the present embodiment, estimated calculation is performed on the assumption that the business system server 201 is not loaded with anything other than backup processing. However, a load due to the business system program 221 of the business system server 201 may be assumed, and the maximum disk transfer bandwidth and the maximum disk IOPS may be estimated as a value reduced by a certain amount.

In the present embodiment, the backup completion time is estimated on the assumption that performance of the repository server 202 is higher than that of the business system server 201 at all times. However, assuming that the performance of the repository server 202 becomes a bottleneck, a correlation may be learned by including performance of the disk or the network I/F of the repository server 202 as a parameter.

Further, in the present embodiment, full backup backing up all the data 203 is assumed. However, estimation may be performed in consideration of a processing time of differential backup or incremental backup.

In addition, in the present embodiment, it is assumed that data is transferred from the business system server 201 at all times when storing two or more pieces of backup data. However, there is also a backup program 204 that takes a method of storing first piece of backup data in the repository server 202 and then copying backup data stored in the repository server 202 to another repository server 202. In this case, a process of estimating the backup completion time may be executed in consideration of copying between repository servers 202.

In step S708, the backup arrangement calculation program 140 calls the restoration processing performance calculation program 142, and estimates the restoration processing time for each combination of the backup repository 205 and a restoration purpose (backup purpose) using configuration information of data to be backed up. For example, the restoration processing performance calculation program 142 learns correlations indicated by graphs 1001, 1002, and 1003 of FIGS. 10A, 10B, and 10C, and executes a process of estimating the restoration processing time for a combination of an arrangement of the backup repository 205 and the restoration purpose (backup purpose) from the disk transfer bandwidth 305, the maximum disk IOPS, and the data capacity 303 of the data 203 of the business system server 201. The graph 1001 of FIG. 10A indicates a correction when the repository server 202 and the business system server 201 serving as a restoration destination are in the same zone, the graph 1002 of FIG. 10B indicates a correction when the repository server 202 and the business system server 201 serving as a restoration destination are in the same region and in different zones, and the graph 1003 of FIG. 10C indicates a correction when the repository server 202 and the business system server 201 serving as a restoration destination are in region A and region B, respectively. A method of learning these correlations differs depending on the characteristics of the backup program 204 and the IT infrastructure included in the management target system 200 similar to the backup processing performance calculation program 141. For example, it is possible to learn a correlation including parameters such as the maximum network bandwidth 304 of the business system server 201, processor performance, and the number of processors. Assuming that the performance of the repository server 202 becomes a bottleneck, a correlation may be learned by including performance of the disk or the network I/F of the repository server 202 as a parameter. In addition, since there is a characteristic that the processor is greatly consumed when the frequency of differential/incremental backup is high during restoration, a correlation may be learned by including the frequency of full backup and differential/incremental backup as a parameter.

In addition, in the present embodiment, for example, in restoration intended to address the zone fault, when the business system server 201, which is a restoration destination, is newly constructed, it is assumed that performance thereof is equivalent to that of the original business system server 201. However, the invention is not limited thereto. In addition, some backup programs may be able to execute backup in units of volumes and execute restoration in units of files. In this case, capacity of data to be restored may be smaller than that of backup data. However, in the present embodiment, when estimating a restoration processing time, in order to estimate a maximum time, estimation may be performed on the assumption that the capacity of the data to be restored is equal to the capacity of the backup data.

In step S709, the backup arrangement calculation program 140 extracts an arrangement combination in which an estimated backup completion time and an estimated restoration processing time of a combination of respective arrangements derived in steps S707 and S708 satisfy the target backup completion time 605 and the target restoration time 607 from the combination stored in step S703, and stores the combination.

In step S710, the backup arrangement calculation program 140 calls an additional resource calculation process, determines whether or not it is necessary to add resources of the repository server 202 in each combination of backup data arrangements in step S709, and calculates the size of resource and cost as necessary. Details of the additional resource calculation process will be described later.

In step S711, the backup arrangement calculation program 140 outputs an arrangement plan including combinations of backup data arrangements and additional resource information. The displayed combinations of backup data arrangements may be arranged in ascending order of additional costs. Alternatively, the combinations may be arranged in descending order of availability. The descending order of availability may be, for example, descending order of the number of backup repositories to be used. The descending order of availability may be descending order of the number of zones in which backup data is stored by the backup job. The descending order of availability may be descending order of the number of regions in which backup data is stored by the backup job. In addition, points may be assigned to the number of backup repositories, the number of zones, and the number of regions, and the scores may be ranked in descending order. Values of the target backup completion time 605 may be arranged in descending order of difference from the estimated backup completion time. Alternatively, values of the target restoration time 607 may be arranged in descending order of difference from the estimated restoration time. The system administrator may select a criterion for arranging the displayed combination of backup data arrangements. In addition, evaluations of additional cost, availability, the estimated backup completion time, and the estimated restoration time may be combined and sorted in the order of evaluation.

<Additional Resource Calculation Process 800>

The additional resource calculation process is a process of calculating the size of additional resource and costs thereof in realizing each combination of backup data arrangements.

Figure 8:
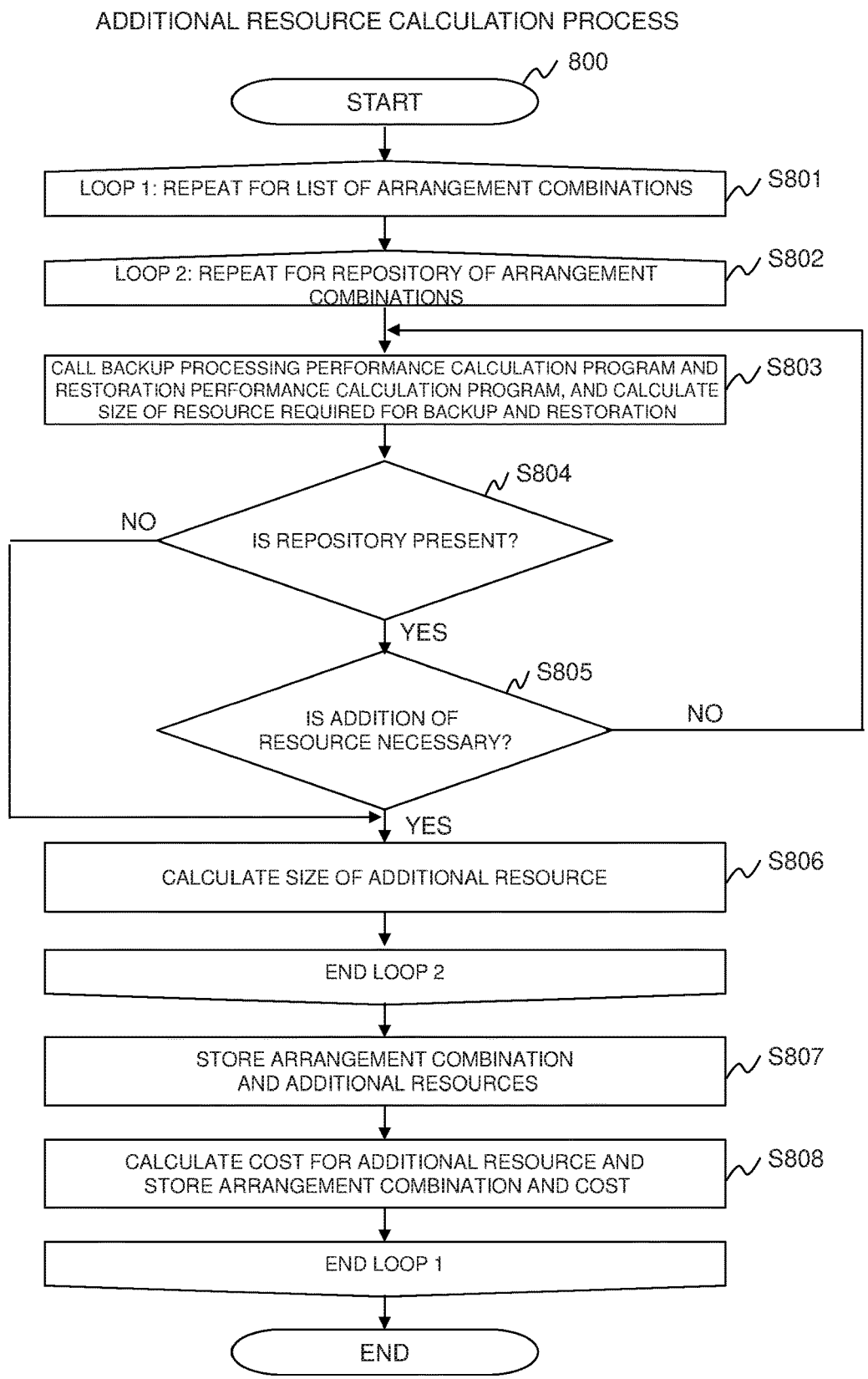
FIG. 8 is a flowchart of an additional resource calculation process according to the first embodiment.

FIG. 8 is a flowchart of an additional resource calculation process 800 according to the first embodiment.

The additional resource calculation process 800 is called by the backup arrangement calculation program 140 in step S710, and processing is started.

In step S801, the backup arrangement calculation program 140 repeats processing of loop 1 (steps S802 to S808) with the arrangement combination extracted in step S707 as a processing target.

In step S802, the backup arrangement calculation program 140 repeats processing of loop 2 (steps S803 to S806) with the backup repository 205 of the arrangement combination as a processing target.

In step S803, the backup arrangement calculation program 140 calls the backup processing performance calculation program 141 and the restoration processing performance calculation program 142, estimates a load of a component included in a data transfer path when backing up and restoring the backup target data 203 of the backup target server 201, and calculates the load as the "size of required resource".

The load of the component included in the data transfer path is, for example, a load (IOPS and transfer bandwidth) on the disk included in the backup repository 205 when storing backup data. The load during execution of restoration may be calculated for each restoration purpose (backup purpose) since the data transfer path differs for each restoration purpose (backup purpose).

For example, the backup processing performance calculation program 141 learns correlations indicated by graphs 1101 to 1103 and 1111 to 1113 of FIGS. 11A to 11F, and executes a process of estimating loads of the disk IOPS and transfer bandwidth of the repository server 202 in each arrangement from the disk transfer bandwidth 305, the maximum disk IOPS 306, and the data capacity 303 of the data 203 of the business system server 201. The graph 1101 of FIG. 11A and the graph 1111 of FIG. 11D indicate correlations when the business system server 201 and the repository server 202 are in the same zone, the graph 1102 of FIG. 11B and the graph 1112 of FIG. 11E indicate correlations when the business system server 201 and the repository server 202 are in the same region and in different zones, and the graph 1103 of FIG. 11C and the graph 1113 of FIG. 11F indicate correlations when the business system server 201 and the repository server 202 are in region A and region B, respectively.

In the present embodiment, only the disk of the repository server 202 is given as the data transfer path. However, the load of other components such as the processor of the repository server and the network bandwidth of the backup target server may be included in calculation.

Note that the graphs 1101 to 1103 and 1111 to 1113 of FIGS. 11A to 11F indicate respective loads when a backup time is the fastest. For this reason, for example, when the fastest backup time is smaller than the target backup completion time 605 input in FIG. 6 with respect to the backup data capacity, a minimum load for achieving the target backup completion time may be set as the "size of required resource". For example, when the backup time in the case where the backup data capacity is 100 GB is 30 minutes in the graph of FIG. 9A, the load of the repository server with the backup data capacity of 100 GB is 1000/sec in IOPS in the graph of FIG. 11A, and a value of the input target backup completion time 605 is 60 minutes, the fastest backup time is half the target backup time, and thus the IOPS required for the repository server may also be calculated as 500/sec, which is a half. A relationship among the fastest backup time, the target backup completion time, and the "size of required resource" may be calculated using the simple calculation described above, or may be calculated using another formula representing a correlation thereof.

In addition to the data transfer performance, the disk capacity required to store the backup data may be calculated as the load. For example, the required disk capacity may be calculated from the backup frequency designated in the backup schedule 606 and a value of the backup retention period 608. In addition, the required disk capacity may be calculated in consideration of the frequency of full backup and incremental/differential backup and a data compression rate.

Figure 9A:
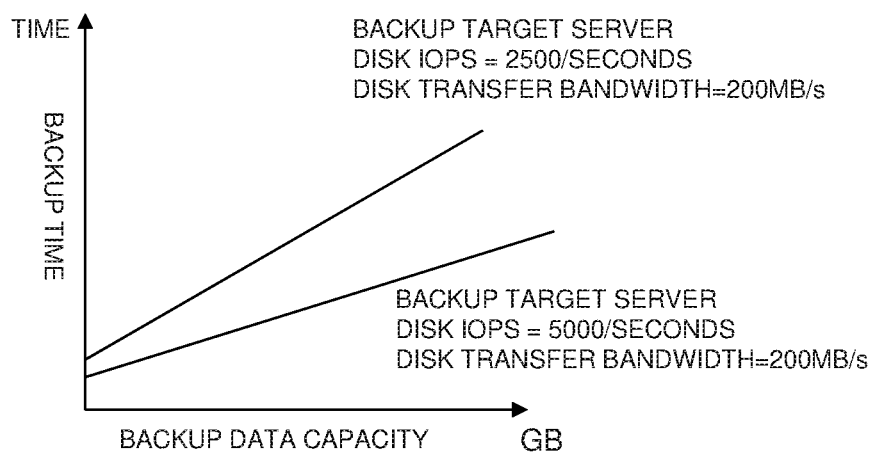
FIG. 9A is a diagram illustrating an example of trained model of a backup processing calculation program according to the first embodiment.
Figure 9B:
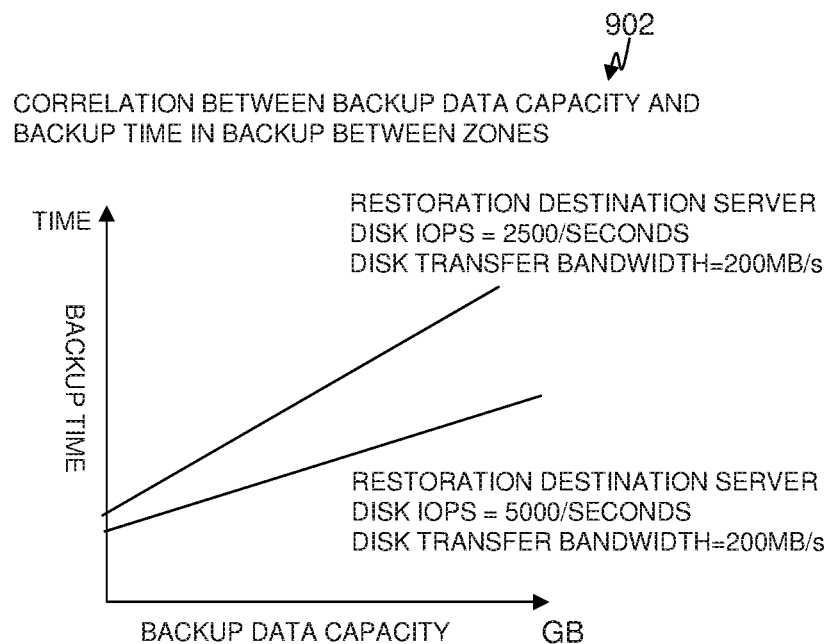
FIG. 9B is a diagram illustrating an example of trained model of the backup processing calculation program according to the first embodiment.
Figure 9C:
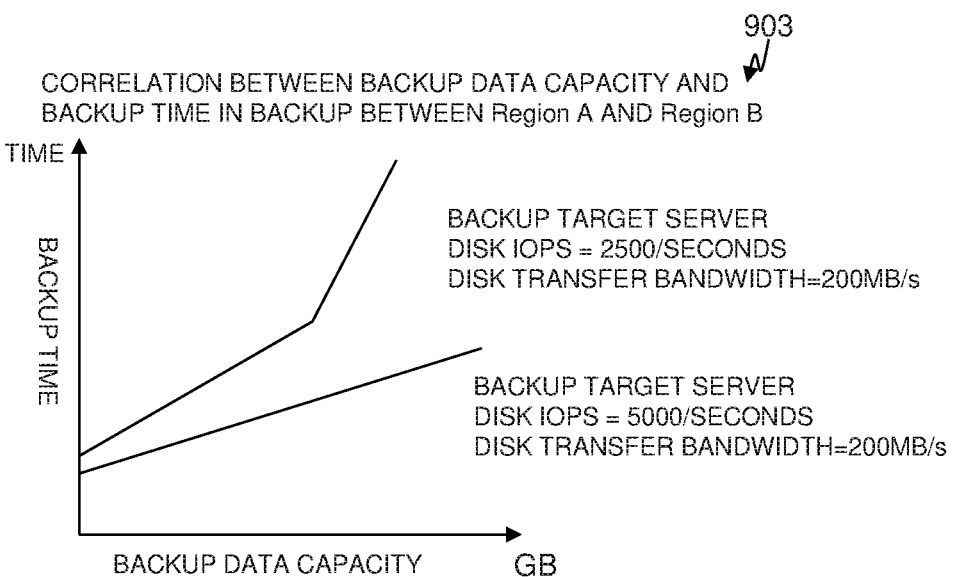
FIG. 9C is a diagram illustrating an example of trained model of the backup processing calculation program according to the first embodiment.

In addition, similar to the correlations of FIGS. 9A, 9B, and 9C, the correlation learned by the backup processing performance calculation program 141 may be learned for each combination of zones, or correlation parameters may include other parameters.

For example, the restoration processing performance calculation program 142 learns correlations indicated by graphs 1201 to 1203 and 1211 to 1213 of FIGS. 12A to 12F, and executes a process of estimating loads of the disk IOPS and transfer bandwidth of the repository server 202 for each combination of the backup data arrangement and restoration purpose (backup purpose) from the disk transfer bandwidth 305, the maximum disk IOPS 306, and the data capacity 303 of the data 203 of the restoration destination business system server 201. The graph 1201 of FIG. 12A and the graph 1211 of FIG. 12D indicate correlations when the repository server 202 and the restoration destination business system server 201 serving as a restoration destination are in the same zone, the graph 1202 of FIG. 12B and the graph 1212 of FIG. 12E indicate correlations when the repository server 202 and the restoration destination business system server 201 serving as a restoration destination are in the same region and in different zones, and the graph 1203 of FIG. 12C and the graph 1213 of FIG. 12F indicate correlations when the repository server 202 and the restoration destination business system server 201 serving as a restoration destination are in region A and region B, respectively.

In the present embodiment, only the disk of the repository server 202 is given as the data transfer path. However, the load of other components such as the processor of the repository server and the network bandwidth of the backup target server may be included in calculation.

Figure 10A:
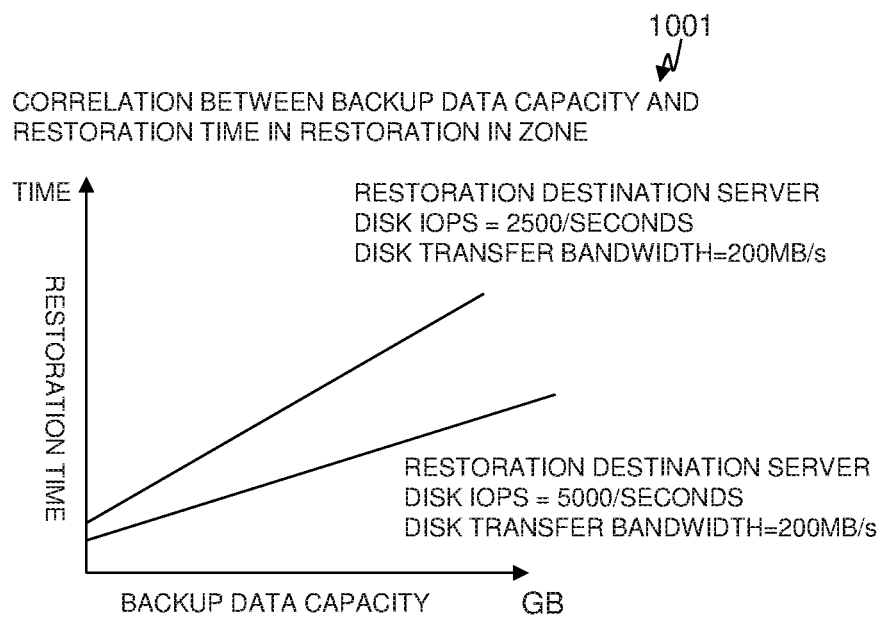
FIG. 10A is a diagram illustrating an example of trained model of a restoration processing calculation program according to the first embodiment.
Figure 10B:
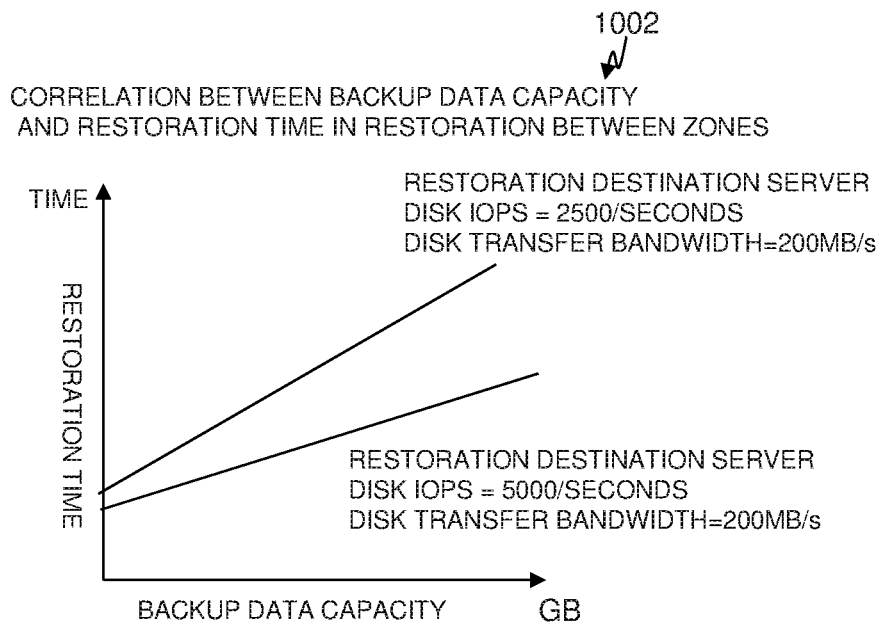
FIG. 10B is a diagram illustrating an example of trained model of the restoration processing calculation program according to the first embodiment.
Figure 10C:
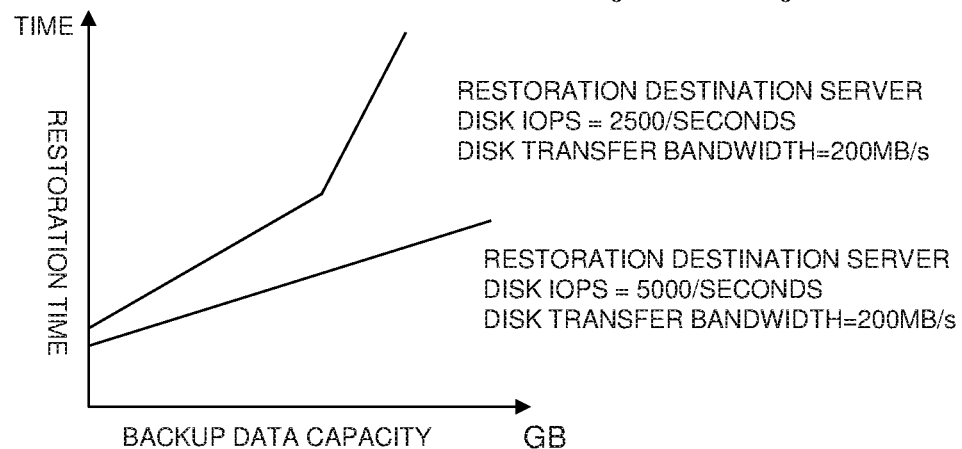
FIG. 10C is a diagram illustrating an example of trained model of the restoration processing calculation program according to the first embodiment.
Figure 11B:
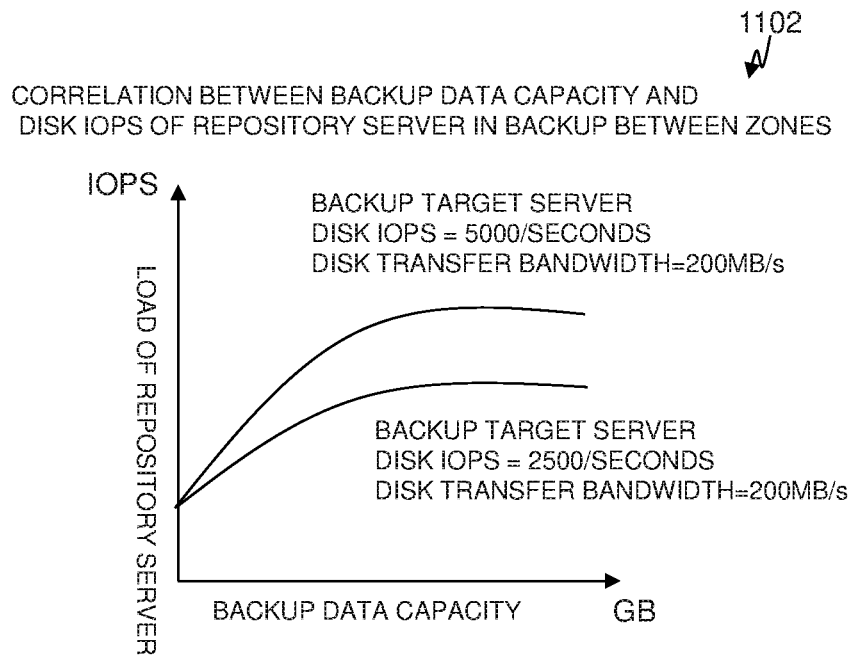
FIG. 11B is a diagram illustrating an example of trained model of the backup processing calculation program according to the first embodiment.
Figure 11C:
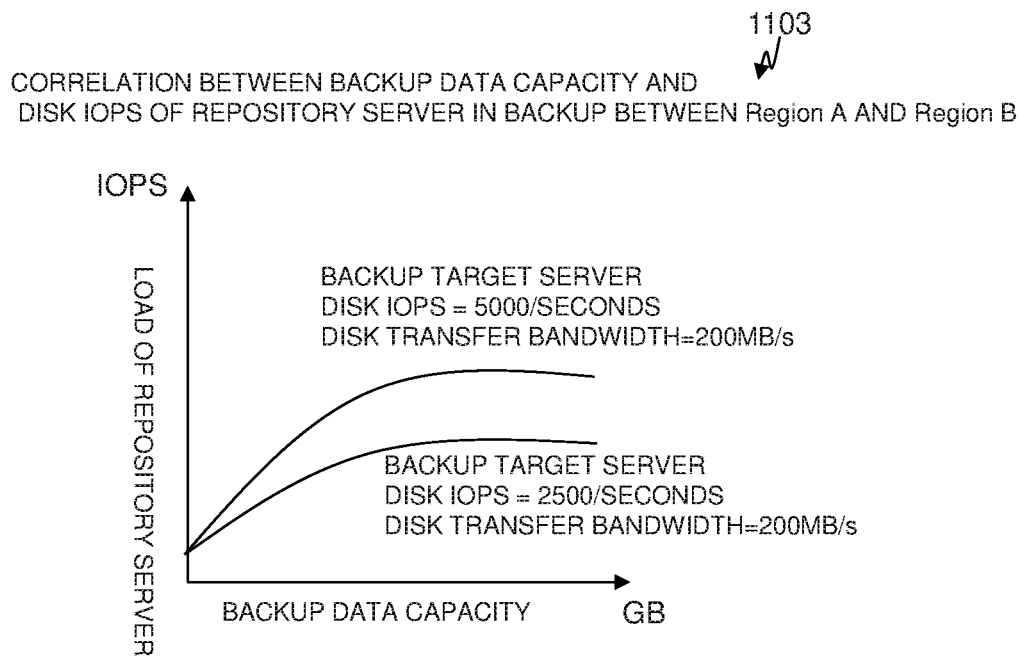
FIG. 11C is a diagram illustrating an example of trained model of the backup processing calculation program according to the first embodiment.
Figure 11D:
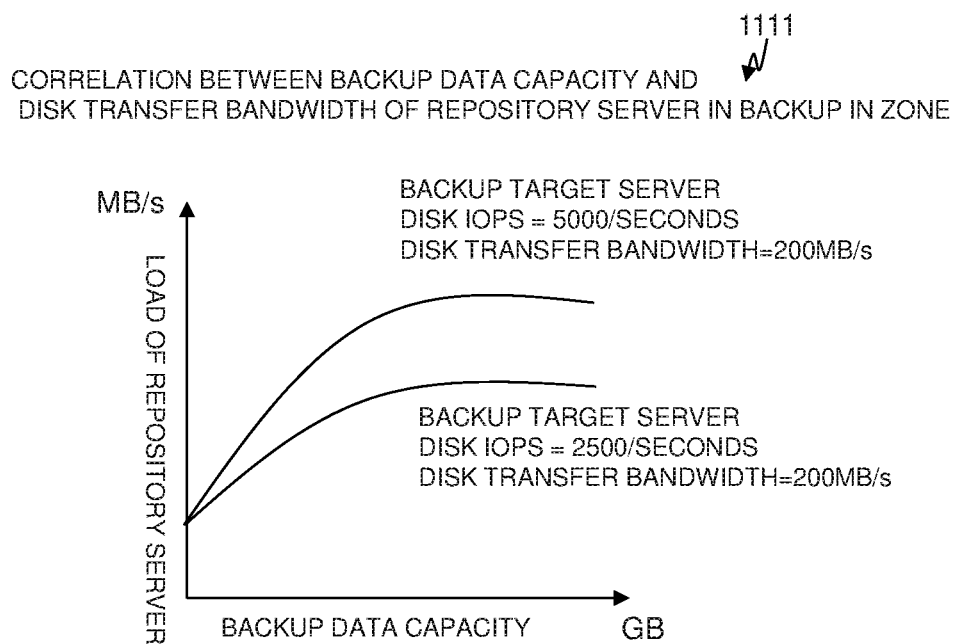
FIG. 11D is a diagram illustrating an example of trained model of the backup processing calculation program according to the first embodiment.
Figure 11E:
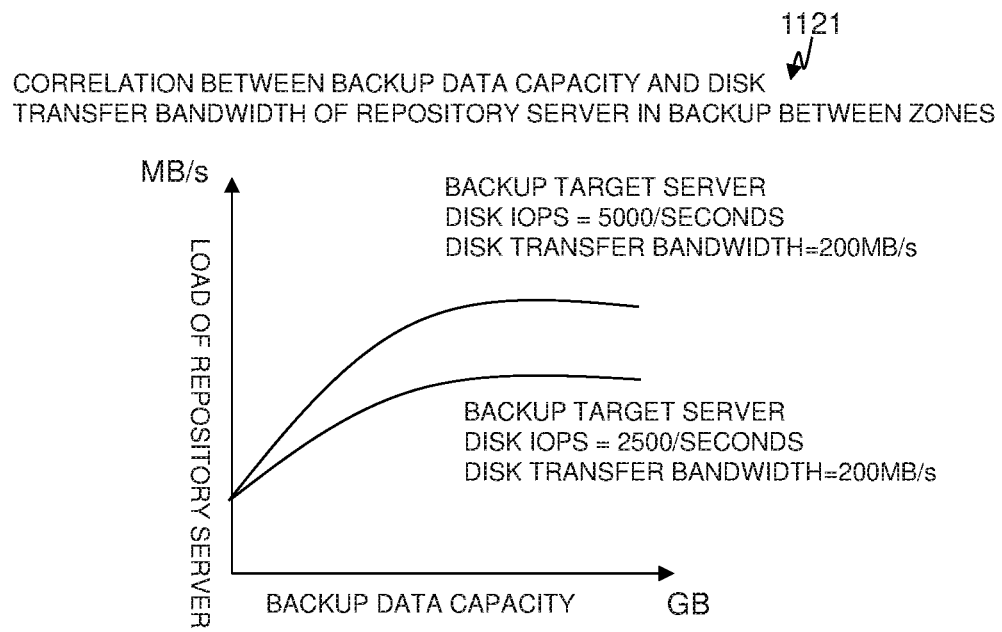
FIG. 11E is a diagram illustrating an example of trained model of the backup processing calculation program according to the first embodiment.
Figure 11F:
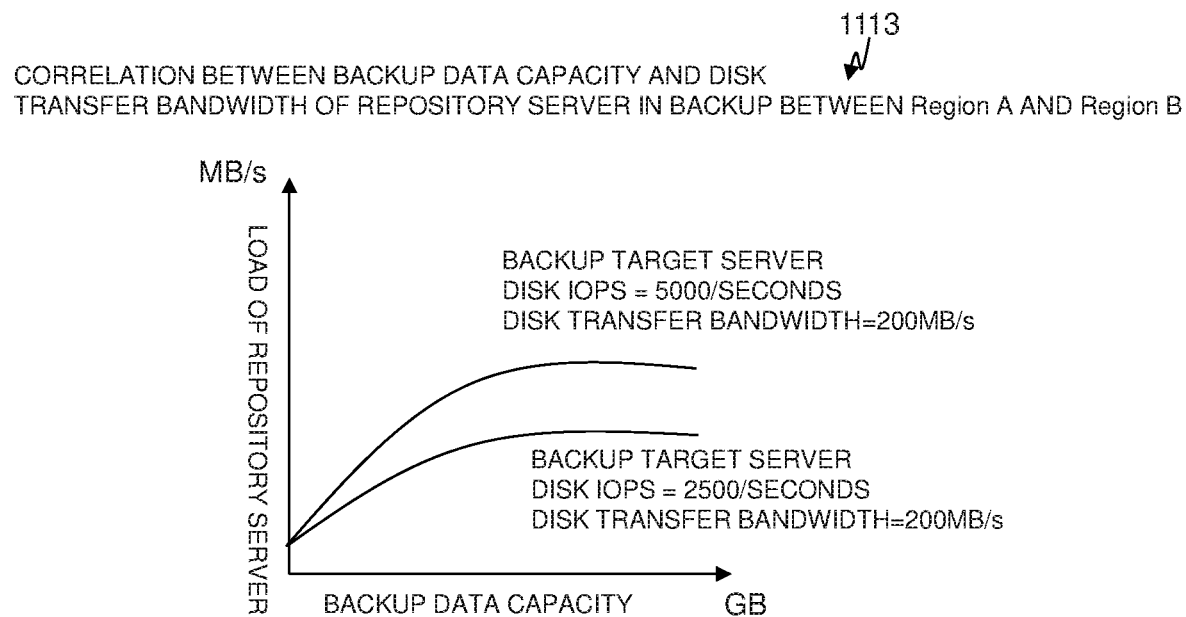
FIG. 11F is a diagram illustrating an example of trained model of the backup processing calculation program according to the first embodiment.
Figure 12A:
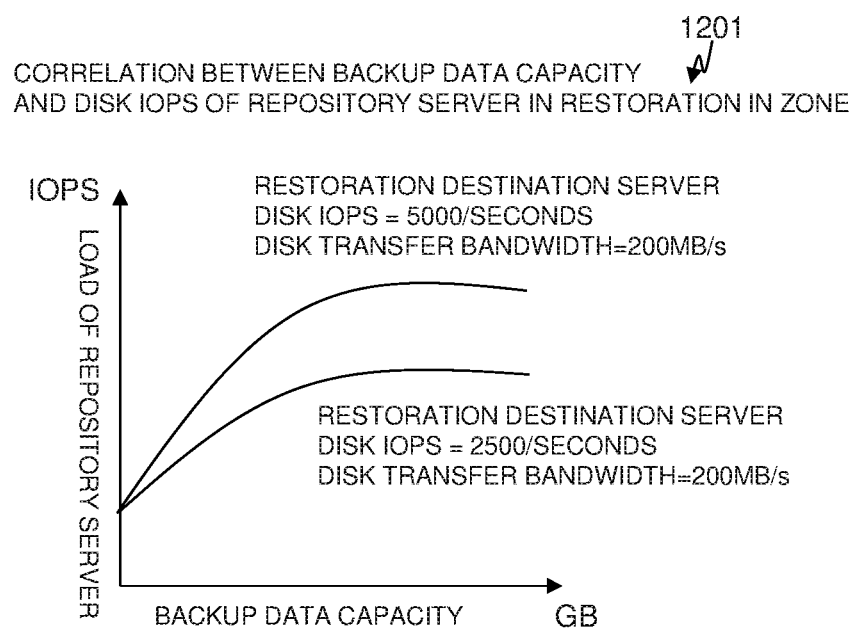
FIG. 12A is a diagram illustrating an example of trained model of the restoration processing calculation program according to the first embodiment.
Figure 12B:
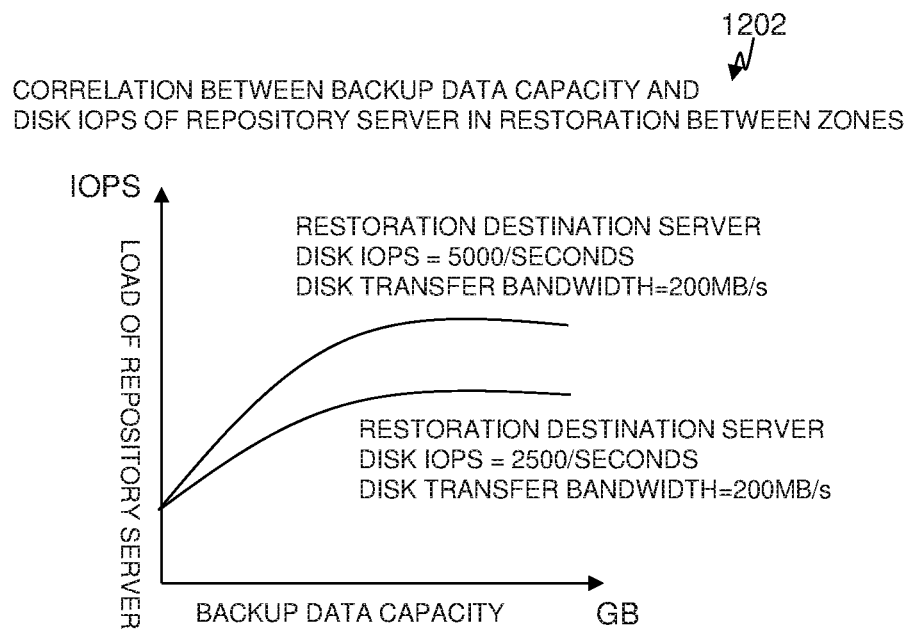
FIG. 12B is a diagram illustrating an example of trained model of the restoration processing calculation program according to the first embodiment.
Figure 12C:
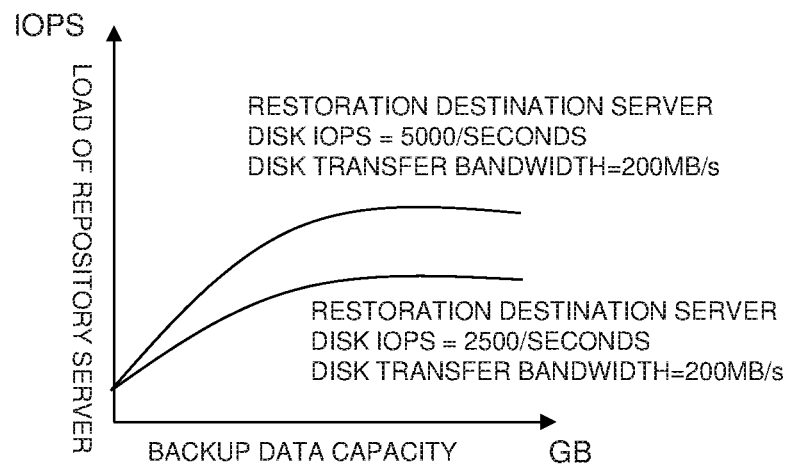
FIG. 12C is a diagram illustrating an example of trained model of the restoration processing calculation program according to the first embodiment.
Figure 12D:
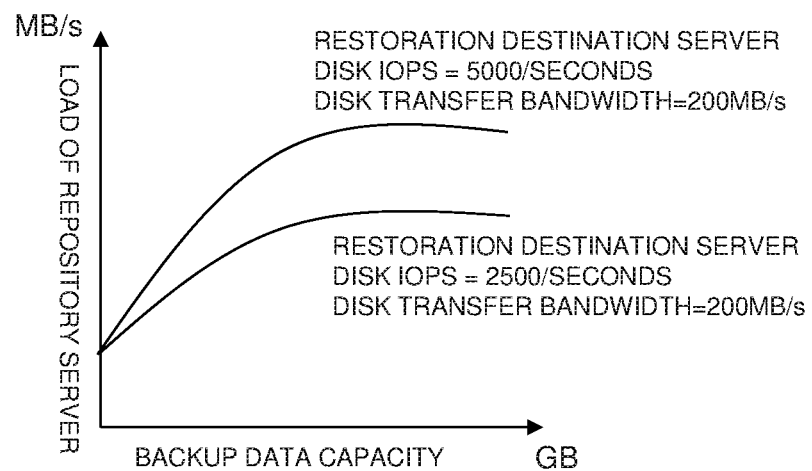
FIG. 12D is a diagram illustrating an example of trained model of the restoration processing calculation program according to the first embodiment.
Figure 12E:
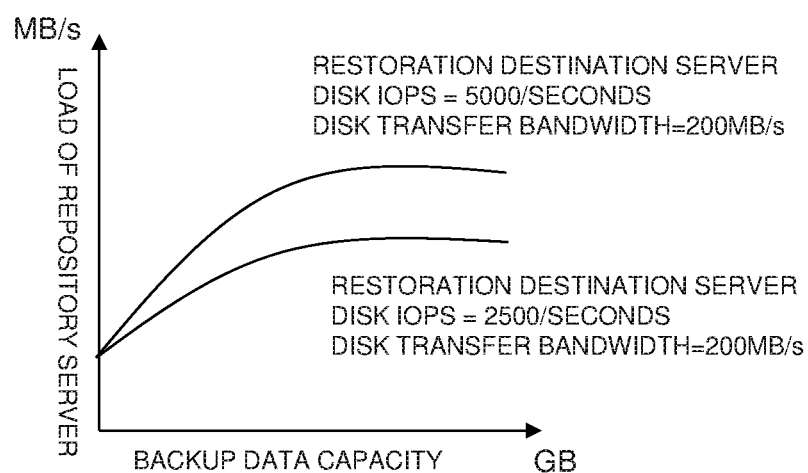
FIG. 12E is a diagram illustrating an example of trained model of the restoration processing calculation program according to the first embodiment.
Figure 12F:
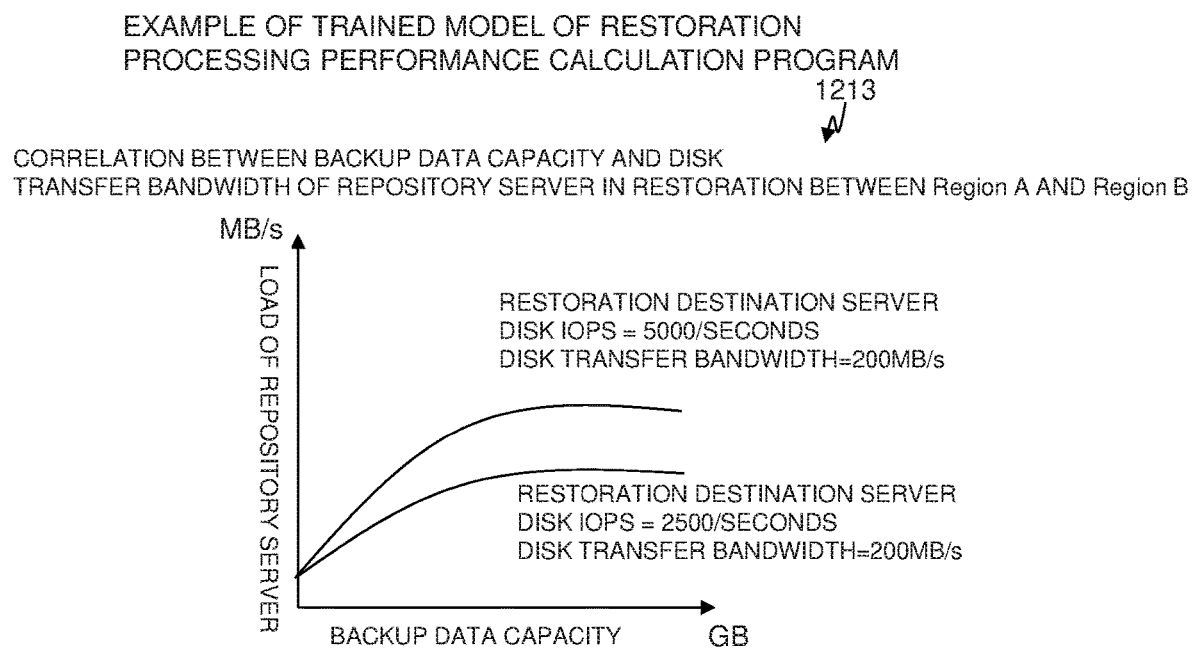
FIG. 12F is a diagram illustrating an example of trained model of the restoration processing calculation program according to the first embodiment.

In addition, similar to the correlations of FIGS. 10A, 10B, and 10C, the correlation learned by the backup processing performance calculation program 141 may be learned for each combination of zones, or correlation parameters may include other parameters.

In step S804, the backup arrangement calculation program 140 searches the backup repository configuration information 112, and determines whether or not the repository server 202 has been constructed in the arrangement of the backup repository 205. The backup arrangement calculation program 140 advances the processing to step S805 when a result of this determination is true (S804: YES), and advances the processing to step S806 when the result of this determination is false (S804: NO).

In step S805, with regard to the backup repository 205 identified by search of step S804, the backup arrangement calculation program 140 determines whether or not the maximum performance of each component of the data transfer path of the backup target server 601 (the maximum disk transfer bandwidth 407 and the maximum disk IOPS 408 in the present embodiment) satisfies the "size of required resource" calculated in step S803. The backup arrangement calculation program 140 advances the processing to step S806 when a result of this determination is true (S805: YES), and advances the processing to step S803 when the result of this determination is false (S805: NO).

In step S806, the backup arrangement calculation program 140 calculates a difference between the "size of required resource" calculated in step S803 and the maximum performance of the constructed backup repository 205 as the size of additional resource. Note that when a determination result in step S804 is false, the repository server 202 having the "size of required resource" becomes the size of additional resource.

Note that, referring to calculation of the "size of additional resource" in the present embodiment, the disk IOPS, the disk transfer bandwidth, and the disk capacity of the repository server 202 are calculated. However, the number of processors, the capacity of the main storage device, the bandwidth of the network I/F, etc. may be included in calculation. In addition, a proxy server, etc. may be prepared for management of backup processing, and in the case of becoming the transfer path of the backup data, the proxy server and resources thereof may also be calculated as the "size of required resource". A target of calculation of the size of additional resource differs depending on the characteristics and configuration of the backup program 204 and the resources that can be added in the public cloud when the management target system 200 is the public cloud.

In step S807, the backup arrangement calculation program 140 stores all of the arrangement combination and the additional resource calculated in step S806. When step S806 has never been executed, "no additional resource" is stored.

In step S808, the backup arrangement calculation program 140 stores the additional cost for the additional resource calculated in step S806 together with the arrangement combination stored in step S807. For example, when the additional resource is a disk transfer bandwidth of 100 MB/s, and a monthly fee for the transfer bandwidth of 100 MB/s is 2000 yen, the additional expense is 2000 yen. In other words, with regard to resources that need to be added in the arrangement combination calculated using the business system configuration information 111 and the backup repository configuration information 112 and stored in step S807, the backup arrangement calculation program 140 calculates the additional cost based on a correlation of costs for the resources, that is, a correlation defined according to the resources.

<Arrangement Plan Selection Screen 12000>

FIG. 13 is a diagram illustrating an example of an arrangement plan selection screen according to the first embodiment. The arrangement plan selection screen 12000 is output by the backup arrangement calculation program 140 in step S711. The output screen illustrated in FIG. 13 illustrates an example of the case of implementation using the GUI.

The arrangement plan selection screen 12000 has an arrangement plan 1300 displaying a combination of backup data arrangements. One or a plurality of the arrangement combinations stored in step S808 is displayed as the arrangement plan 1300. In addition, the arrangement plan display section 1300 has backup destination 1301, additional cost 1302, additional resource 1303, estimated backup completion time 1304, estimated restoration time 1305, backup frequency 1306, and backup data arrangement 1307. The arrangement combination of the backup data stored in step S808 is displayed as the backup destination 1301. The additional cost stored in step S808 is displayed as the additional cost 1302. The additional resource stored in step S807 is displayed as the additional resource 1303. The estimated backup processing time calculated in step S707 is displayed as the estimated backup completion time 1304. When a plurality of repository servers is present, a maximum value of the estimated backup completion time for each repository server 202 may be displayed. The estimated restoration processing time for each restoration purpose calculated in step S708 is displayed as the estimated restoration time 1305. When a plurality of repository servers is present, a maximum value or a minimum value of the estimated restoration time for each repository server 202 may be displayed. For example, a value calculated based on the backup frequency input in the backup schedule 606 may be displayed as the backup frequency 1306. The backup data arrangement (zone, region, and repository server) in the combination of backup data arrangements stored in step S808 and the number of pieces of backup data in each arrangement (the number written in a circle of the backup data arrangement 1307) are displayed as the backup data arrangement 1307.

One of arrangement plans 1300 is selected by the system administrator.

The arrangement plan selection screen 12000 has a job registration button 1311. When the system administrator selects one of the arrangement plans 1300 and presses the job registration button 1311, the backup configuration change program 143 and the backup job registration program 144 are called.

Information about the backup job is registered in the backup job information 121 based on the selected arrangement plan 1300 and input values on the backup setting input screen 11000.

<Backup Job Information>

FIG. 14 is a configuration diagram of a table of the backup job information 121 according to the first embodiment.

Information on the backup job registered by the backup job registration program 144 is stored as the backup job information 121. The backup job information 121 includes fields of a job ID 1401, a source server ID 1402, a source data ID 1403, a backup repository 1404, a schedule 1405, an estimated backup completion time 1406, a backup purpose 1407, and an estimated restoration time 1408. One entry is present for the backup job. Note that the fields included in the entry are not limited to those described above. Any of the fields described above does not have to be included, or other fields may be included.

A value that uniquely identifies a backup job is stored in the job ID 1401. A value that uniquely identifies the business system server 201 based on a value input by the backup target server 601 on the backup setting input screen 11000 is stored in the source 1402. A value that uniquely identifies the data 203 of the business system server 201 based on a value input in the backup target data 602 on the backup setting input screen 11000 is stored in the source data ID 1403. A value that uniquely identifies the backup repository 205 indicated by the backup destination 1301 of the arrangement plan 1300 selected on the arrangement plan selection screen 12000 is stored in the backup repository 1404. A value representing execution start timing of the backup job based on a value input in the backup schedule 606 on the backup setting input screen 11000 is stored in the schedule 1405. An estimated backup processing time for the arrangement of each piece of backup data calculated in step S707 is stored in the estimated backup completion time 1406. A value that identifies the use of the backup data stored in the repository server indicated by the backup repository 1404 based on a value input in the backup purpose 603 on the backup setting input screen 11000 and the entry of the arrangement constraint rule 113 acquired when the arrangement plan is derived is stored in the backup purpose 1407. An estimated restoration processing time for arrangement of each piece of backup data calculated in step S708 and the backup purpose (restoration purpose) is stored in the estimated restoration time 1408.

Figure 15A:
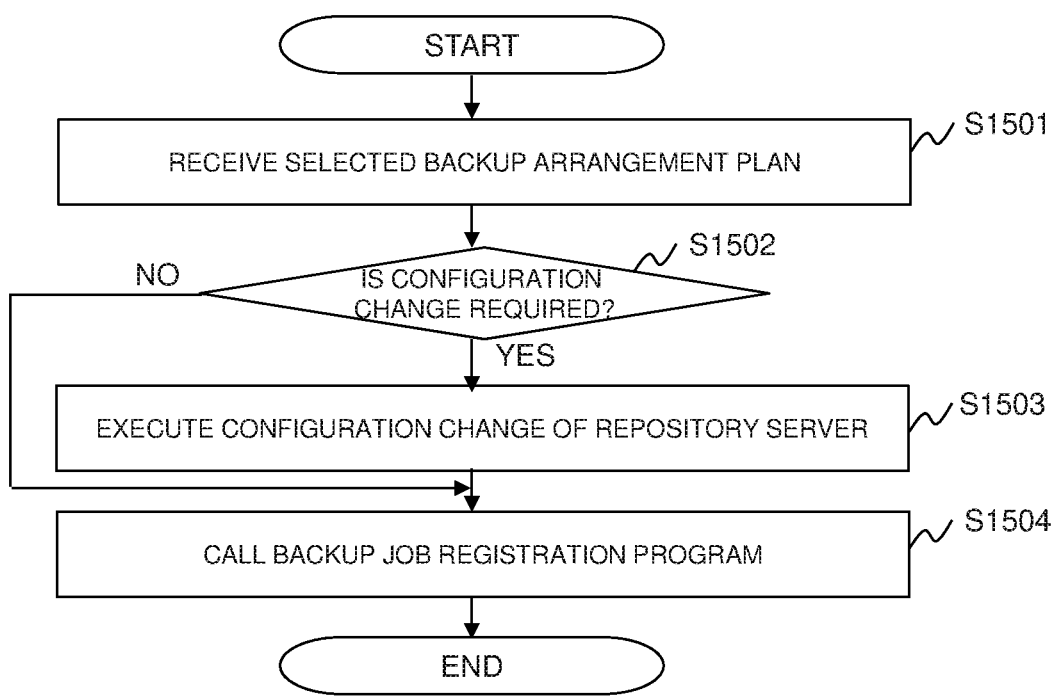
FIG. 15A is a flowchart of a backup configuration change program according to the first embodiment.
Figure 15B:
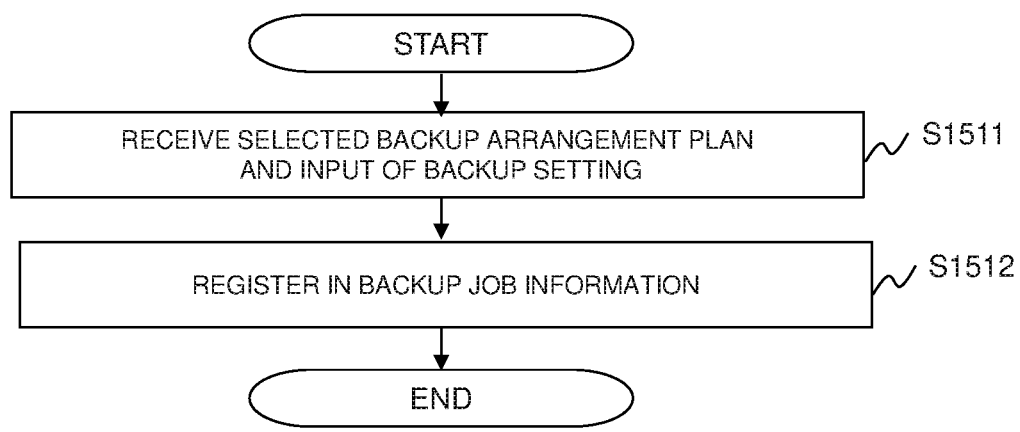
FIG. 15B is a flowchart of a backup job registration program according to the first embodiment.
Figure 15C:
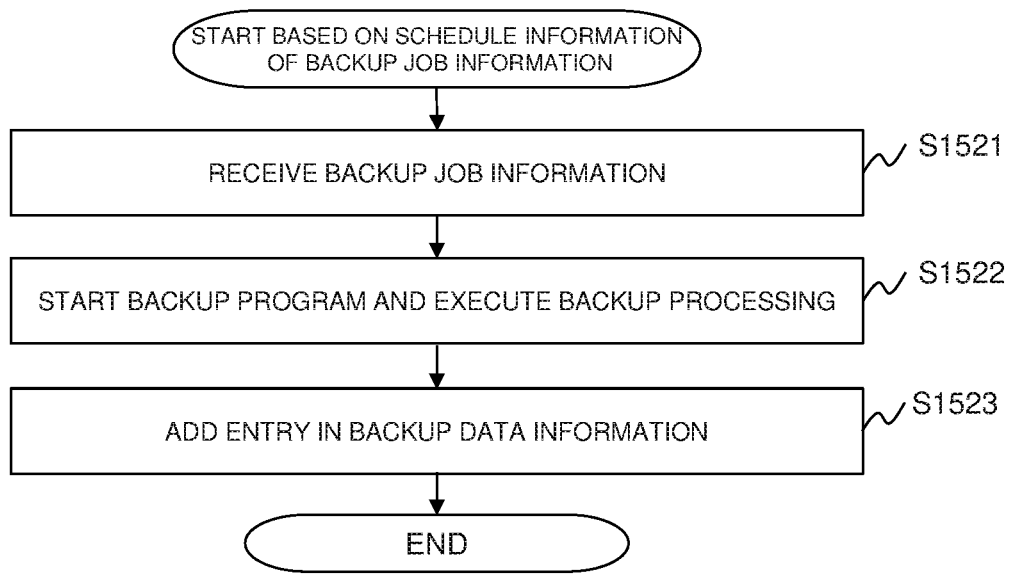
FIG. 15C is a flowchart of a backup job execution program according to the first embodiment.

FIGS. 15A to 15C are flowcharts of the backup configuration change program 143, the backup job registration program 144, and the backup job execution program 145, which are a series of processes until the system administrator registers and executes a backup job after selecting the arrangement plan 1300 and pressing the job registration button 1311 on the arrangement plan selection screen 12000.

In FIG. 15A, the backup configuration change program 143 starts processing when the job registration button 1311 is pressed on the arrangement plan selection screen 12000.

In step S1501, the backup configuration change program 143 receives information on the arrangement plan 1300 selected by the system administrator.

In step S1502, the backup configuration change program 143 determines whether or not the received arrangement plan 1300 requires configuration change of the repository server 202 or addition of the repository server 202. The backup configuration change program 143 advances the processing to step S1503 when a result of this determination is true (S1502: YES), and advances the processing to step S1504 when the result of this determination is false (S1502: NO).

In step S1503, the backup configuration change program 143 executes configuration change of the repository server 202 or addition of the repository server 202 based on the information on the arrangement plan 1300.

In step S1504, the backup configuration change program 143 calls the backup job registration program 144.

In FIG. 15B, the backup job registration program 144 is called by the backup configuration change program 143, and processing is started. Alternatively, the processing may be started by pressing the job registration button 1311 on the arrangement plan selection screen 12000.

In step S1511, the backup job registration program 144 receives the information on the arrangement plan 1300 selected by the system administrator and information on the backup setting screen 11000 input by the system administrator.

In step S1512, the backup job registration program 144 adds some or all information of information on the received arrangement plan 1300 and the input of the backup setting screen 11000 as entries of the backup job information 121.

In FIG. 15C, the backup job execution program 145 periodically checks the backup job information 121, and when a time corresponding to the schedule 1405 is reached, processing is started.

In step S1521, the backup job execution program 145 receives the entry of the backup job information.

In step S1522, the backup job execution program 145 starts the backup program 204 using the entry of the backup job information as a set value, and executes backup processing.

In step S1523, the backup job execution program 145 stores information related to backup data created by the executed backup job in the backup data information 122 as an entry.

<Backup Data Information>

FIG. 16 is a configuration diagram of a table of the backup data information 122 according to the first embodiment.

Information on the backup data registered in step S1523 by the backup job execution program 145 is stored as the backup data information 122. The backup data information 122 includes fields of a backup data ID 1601, a source server ID 1602, a source data ID 1603, a backup repository 1604, a backup purpose 1605, an estimated restoration time 1606, and a backup time 1607. One entry is present for backup data created by execution of a backup job. Note that the fields included in the entry are not limited to those described above. Any of the fields described above does not have to be included, or other fields may be included.

A value that uniquely identifies backup data is stored in the backup data ID 1601. A value of the source server ID 1402 of the backup job executed by the backup job execution program 145 is stored in the source server ID 1602. A value of the source data ID 1403 of the backup job executed by the backup job execution program 145 is stored in the source data ID 1603. A value of the backup repository 1404 of the backup job executed by the backup job execution program 145 is stored in the backup repository 1604. A value of the backup purpose 1407 of the backup job executed by the backup job execution program 145 is stored in the backup purpose 1605. A value of the estimated restoration time 1408 of the backup job executed by the backup job execution program 145 is stored in the estimated restoration time 1606. A time when the backup job executed by the backup job execution program 145 is completed is stored in the backup time 1607.

According to the first embodiment, the backup management system 100 can construct and set a backup job and a configuration of a repository server which is cost effective for backup and is a backup data storage destination satisfying backup requirements (a backup purpose, a target backup completion time, a target restoration processing time, backup data availability, etc.) designated by the system administrator.

In this way, in the first embodiment, as described with reference to S701 to S709 of FIG. 7, etc., for example, in the backup management system 100 in which the management calculator 160, which is a computer having a processor and memory, executes backup and restoration of a management target to manage backup data, the processor derives an arrangement combination of the backup repository satisfying the arrangement constraint rule based on the business system configuration information 111, which is information related to the configuration of the business system server 201 included in the management target, the backup repository configuration information 112, which is information related to the configuration of the repository server that stores the backup data, input backup setting information (for example, input information on the backup setting input screen illustrated in FIG. 6), and the arrangement constraint rule 113 for determining an arrangement of the backup data according to the backup purpose, estimates a predetermined backup processing time (for example, a processing time based on trained model illustrated in FIG. 9) for the arrangement of the backup repository, estimates a predetermined restoration processing time (for example, a processing time based on trained model illustrated in FIG. 10) for the arrangement of the backup repository and the restoration purpose, and derives the combination in which the backup processing time and the restoration processing time satisfy the target backup completion time and the target restoration processing time included in the input backup setting information among arrangement combinations of the backup repository. In this way, in the data backup system, a cost-effective data protection configuration/setting can be realized.

In other words, in the case of managing a backup system including a server to be managed, a backup program that manages and executes backup processing and restoration processing of the server, and a repository server that stores backup data, it is possible to search for a backup data storage destination satisfying backup requirements (for example, a backup purpose, a backup job execution time, a restoration processing time, backup data availability, etc.) for an IT system to be backed up. In addition, it is possible to search for a backup data storage destination that satisfies the requirements and is cost-effective, and when there is no backup data storage destination satisfying the requirements, it becomes possible to change the configuration of the backup system.

In addition, as described with reference to S711 of FIG. 7, FIG. 13, etc., the processor displays a list of arrangement combinations of the backup repository (for example, the arrangement plan selection screen 12000). In addition, the processor sorts and displays the arrangement combinations of the backup repository in ascending order of costs that need to be added, in descending order of availability, or in order of evaluation of a combination thereof. Therefore, a user of this system can easily confirm and select a backup data storage destination that satisfies the requirements and is cost effective.

Further, as described with reference to FIG. 8, etc., the processor calculates and displays a resource that needs to be added among the arrangement combinations of the backup repository based on the business system configuration information 111 and the backup repository configuration information 112. In this way, the user of this system can identify the resource that needs to be added at a glance.

Further, as described with reference to S808 of FIG. 8, etc., the processor calculates and displays costs that need to be added from a correlation of costs for a resource that needs to be added among the business system configuration information 111, the backup repository configuration information 112, and the respective arrangement combinations of the backup repository. In this way, the user of this system can identify the cost for the resource, that needs to be added, satisfying the correlation at a glance.

Further, as described with reference to FIGS. 15B and 15C, etc., the processor creates the backup job information 121, which is setting information of the backup job, based on a selected arrangement combination among the arrangement combinations of the backup repository, and executes the backup job. In this way, data can be automatically backed up to a backup destination including the selected arrangement combination.

Further, as described with reference to FIG. 15A, etc., the processor changes a configuration of a management target based on the selected arrangement combination among the arrangement combinations of the backup repository and the resource that needs to be added. In this way, the protection configuration/setting can be changed to a cost-effective backup destination, and a cost burden on the user of this system can be reduced.

Second Embodiment

Next, a backup management system according to the second embodiment will be described. In the following description, a difference from the first embodiment will be mainly described. Further, the same symbols are used for equivalent components, programs having equivalent functions, and tables having equivalent items, and descriptions are omitted or simplified.

The second embodiment differs from the first embodiment in that another backup job is previously registered before the system administrator sets the backup job on the backup setting screen 11000. When another backup job is executed in the same time period as that of a newly set backup job, and part or all of the data transfer path overlaps, resources of components of the data transfer path are mutually consumed. Thus, performance of backup processing is degraded. Therefore, it is necessary to design the configuration of the backup repository in consideration of resources consumed by another backup job.

In the second embodiment, resources to be added to candidates for arrangements of backup data derived by the backup arrangement calculation program 140 are calculated, including resource consumption of components of the data transfer path by another backup job. A management calculator 160 according to the second embodiment stores a program for executing an additional resource calculation process 1700 in place of the additional resource calculation process 800 of FIG. 8.

<Additional Resource Calculation Process>

Figure 17:
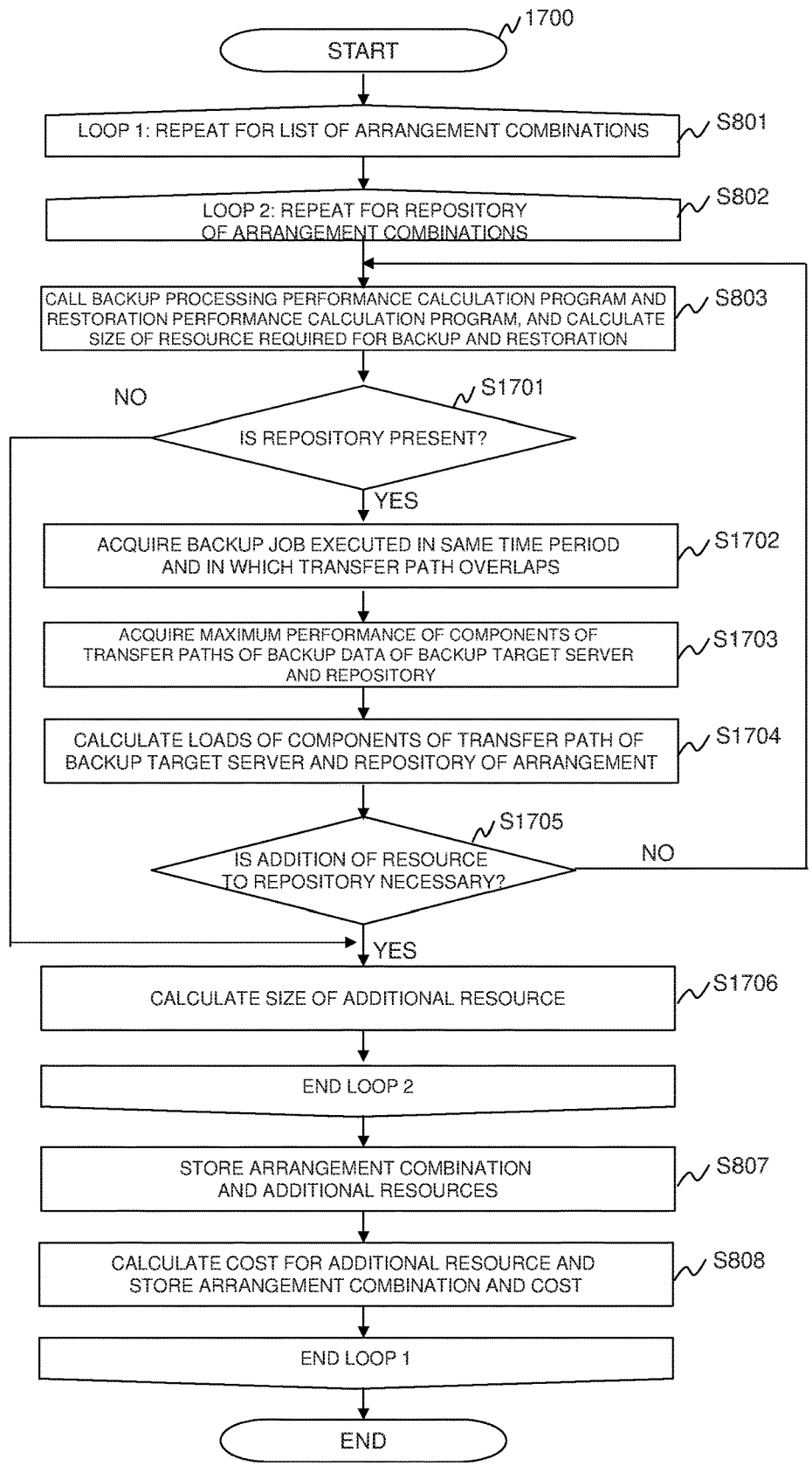
FIG. 17 is a flowchart of an additional resource calculation process according to a second embodiment.

FIG. 17 is a flowchart of the additional resource calculation process according to the second embodiment.

The additional resource calculation process according to the second embodiment is called by the backup arrangement calculation program 140 to start processing, as in the first embodiment.

Steps S801 to S803 of FIG. 17 execute processing equivalent to steps S801 to S803 illustrated in FIG. 8.

In step S1701, the backup arrangement calculation program 140 searches the backup repository configuration information 112, and determines whether or not the repository server 202 has been constructed in the arrangement of the backup repository 205. The backup arrangement calculation program 140 advances the processing to step S1702 when a result of this determination is true (S1701: YES), and advances the processing to step S1708 when the result of this determination is false (S1701: NO).

In step S1702, the backup arrangement calculation program 140 calculates a time period in which backup processing is executed from a backup schedule 606 of a new backup job on a backup setting input screen 600 and the estimated backup processing time calculated in step S707, and acquires all entries of the backup job information 121 in which a backup processing execution time period overlaps with the new backup job based on the schedule 1405 of the backup job information 121 and the estimated backup completion time. Furthermore, a backup job in which a transfer path of backup data overlaps (in the present embodiment, when the repository server 202 storing backup data is the same) is extracted. In the present embodiment, a configuration in which the repository server 202 has one network I/F or backup repository is given as an example. However, when a plurality of network I/Fs or backup repositories are provided, the network I/Fs or backup repositories may be processed as different transfer paths.

In step S1703, the backup arrangement calculation program 140 acquires maximum performance of components of transfer paths of backup data of the backup target server 601 and the backup repository from the backup repository configuration information 112 of FIG. 4. In the present embodiment, the disk IOPS and the disk transfer bandwidth of the backup repository 205 are targeted as resources that can become bottlenecks in the data transfer path. For this reason, in the present embodiment, in step S1703, the backup repository configuration information 112 is searched for the backup repository, and values of the maximum disk transfer bandwidth 407 and the maximum disk IOPS 408 are acquired. In the present embodiment, only the disk of the repository server 202 is given as the data transfer path. However, maximum performance of other components such as the processor of the repository server and the network bandwidth of the backup target server may be included. In addition, in order to calculate not only the data transfer performance but also disk capacity that needs to be added to store the backup data, the free capacity 404 of the repository may be included in the target.

In step S1704, the backup arrangement calculation program 140 calculates loads of components of the transfer path of the backup data of the backup target server 601 and the backup repository of the arrangement. The loads of the components are calculated from a load due to the backup job extracted in step S1702. Referring to the load due to the backup job, a load of a backup job executed in the past may be calculated from values of the business system load information 131 and the backup repository load information 132, and the backup processing performance calculation program 141 may calculate the load using the correlations illustrated in FIGS. 11A to 11F in the same manner as in step S803.

In step S1705, the backup arrangement calculation program 140 determines whether or not the maximum performance (the maximum disk transfer bandwidth 407 and the maximum disk IOPS 408 in the present embodiment) of each component of the data transfer path specified in the search in step S1703 satisfies the "size of required resource" calculated in step S803 and the load due to each backup job calculated in step S1704. The backup arrangement calculation program 140 advances the processing to step S1706 when a result of this determination is true (S1705: YES), and advances the processing to step S803 when the result of this determination is false (S1705: NO).

In step S1706, the backup arrangement calculation program 140 calculates the size of insufficient resource as the size of additional resource from the maximum performance of each component of the data transfer path specified in the search in step S1703, the "size of required resource" calculated in step S803, and the load of each backup job calculated in step S1704. Note that, when the determination result of step S1701 is false, the repository server 202 having the "size of required resource" becomes the size of additional resource.

Steps S801 to S803 of FIG. 17 execute processing equivalent to steps S807 to S808 illustrated in FIG. 8.

As described above, according to the second embodiment, as described with reference to FIG. 17, etc., for example, the processor of the management calculator 160, which is a computer having a processor and a memory, calculates the load of the data transfer path in backup and restoration in the arrangement combination of the backup repository from the business system configuration information 111, the backup repository configuration information 112, the arrangement combination of the backup repository, and the backup job information 121, which is previously registered backup job setting information, and calculates and displays the resource that needs to be added. In this way, when another backup job is executed in the same time period as that of a newly set backup job, and part or all of the data transfer path overlaps, the size of additional resource can be calculated in consideration of a resource consumed by the other backup job.

Third Embodiment

Next, a backup management system 100 according to a third embodiment will be described. In the following description, a difference from the first and second embodiments will be mainly described. Further, the same symbols are used for equivalent components, programs having equivalent functions, and tables having equivalent items, and descriptions are omitted or simplified.

In the first and second embodiments, a description has been given of a method when the business system server has been previously constructed, and the new backup job is set. However, when an IT system is constructed, a backup system is designed before actually constructing the business system server in some cases. Therefore, it is necessary to determine a configuration of the backup system from assumed configuration information of the business system server in a state where the business system server is not actually present.

Therefore, in the backup management system 100 according to the third embodiment, an example in which a configuration of the backup system is determined based on information of the business system server, which is not yet present, by the system administrator will be described.

A management calculator 160 according to the third embodiment displays a backup setting input screen 11001 in place of the backup setting input screen 11000.

<Backup Setting Input Screen>

FIG. 18 is a diagram illustrating an example of the backup setting input screen 11001 according to the third embodiment. The input screen illustrated in FIG. 18 illustrates an example of the case of implementation using the GUI. Note that parts similar to those of the backup setting input screen 11000 according to the first embodiment are denoted by the same reference numerals.

The backup setting input screen 11001 in the third embodiment is an input screen for the system administrator to input information necessary for constructing a backup system for a business system server to be constructed. In particular, a main purpose of the present embodiment is to design and construct the repository server 202.

The backup setting input screen 11001 of the third embodiment has a total data capacity 1801, the number of backup target servers 1802, assumed business system disk IOPS 1803, and an assumed business system disk transfer bandwidth 1804. In addition, the backup setting input screen 11001 also has a backup purpose 603, the number of backups 604, a target backup completion time 605, a backup schedule 606, a target restoration time 607, and a backup retention period 608, which are similar to those of the backup setting input screen 11000 of FIG. 6.

The total data capacity 1801 is a section that defines an estimated total value of data to be backed up in the entire newly constructed management target system 200. The number of backup target servers 1802 is a section that defines the number of business system servers to be backed up. The assumed business system disk IOPS 1803 is a section that defines disk IOPS of the business system server scheduled to be constructed in the management target system 200 to be newly constructed. The assumed business system disk transfer bandwidth 1804 is a section that defines a disk transfer bandwidth of the business system server scheduled to be constructed in the management target system 200 to be newly constructed. In the present embodiment, even when a plurality of business system servers is present, all the business system servers are considered to be the same, and only one value is defined for each of the total data capacity 1801, the assumed business system disk IOPS 1803, and the assumed business system disk transfer bandwidth 1804. However, setting may be performed for each of the business system servers. A value to be defined may be input by the system administrator, or a value automatically calculated from a track record of another system in the past may be input. In the present embodiment, only the disk IOPS and the disk transfer bandwidth are targeted for input. However, a resource that can become a bottleneck may also be targeted. For example, the transfer bandwidth of the network I/F or the number of processors may be targeted.

In processing of the backup arrangement calculation program 140 in the third embodiment, in step S704, a data backup target server and data configuration information are not acquired from the business system configuration information 111, and are calculated from information defined on the backup setting input screen 11001. For example, a value obtained by dividing the total data capacity 1801 instead of the data capacity 303 of the business system configuration information 111 by the number of backup target servers 1802 is used. A value of the assumed business system disk transfer bandwidth 1804 is used instead of a value of the maximum disk transfer bandwidth 305. The assumed business system server IOPS 1803 is used instead of the maximum disk IOPS 306. A random or fixed value is used as the arrangement 307.

In the additional resource calculation process in the third embodiment, determination in step S804 is false (S804: NO) at all times, and in step S806, the size of required resource at the time of initial system construction is stored and output instead of the size of additional resource.

As described above, according to the third embodiment, as described with reference to FIG. 18, etc., the processor of the management calculator 160, which is a computer having a processor and a memory, generates the business system configuration information based on the input backup setting information including setting information before construction of the business system server (for example, the total data capacity 1801, the number of backup target servers 1802, the assumed business system disk IOPS 1803, and the assumed business system disk transfer bandwidth 1804), and derives the combination in which the backup processing time and the restoration processing time satisfy the target backup completion time and the target restoration processing time included in the input backup setting information among the arrangement combinations of the backup repository. In this way, a backup system can be designed and estimated before the management target system 200 is constructed.

Fourth Embodiment

Next, a backup management system 100 according to a fourth embodiment will be described. In the following description, a difference from the first, second, and third embodiments will be mainly described. Further, the same symbols are used for equivalent components, programs having equivalent functions, and tables having equivalent items, and descriptions are omitted or simplified.

In the fourth embodiment, a description will be given of an example of executing restoration processing after designing the backup system and setting the backup job in the first, second, and third embodiments.

<Restoration Execution Screen 13000*a*>

FIG. 19 is a diagram illustrating an example of a restoration execution screen 13000*a* according to the fourth embodiment.

An input screen illustrated in FIG. 19 illustrates an example of the case of implementation using the GUI.

The restoration execution screen 13000*a* in the fourth embodiment is an input screen for the system administrator to input information necessary for executing restoration processing using backup data stored in the repository server 202. The system administrator may execute restoration processing of backup data related to the data 203 of the business system server 201 in order to start the business system server 201 or the business system server 201 as a substitute in the event of a fault in the related IT infrastructure or software. Alternatively, when an abnormality occurs in the data 203 of the business system server 201, the system administrator may execute backup data restoration processing related to the data 203 in order to restore the data 203 to a certain point in time.

The restoration execution screen 13000*a* has a restoration target server 1901, restoration target data 1902, a restoration purpose 1903, and a button 1904.

The restoration target server 1901 is a section that defines the business system server 201 to be restored. The restoration target data 1902 is a section that defines the data 203 of the business system server 201 to be restored. In the present embodiment, units of data to be backed up and data to be restored are unified in units of volumes obtained by logically dividing the sub-storage device 213. However, depending on the function of the backup program 204, it is possible to perform backup in units of volumes and perform restoration in units of files included in the volumes. In this case, a value that identifies a file may be defined in the restoration target data 1902. At this time, it is assumed that the backup management system 100 stores a relationship indicating in which volume a file is stored. The restoration purpose 1903 is a section that defines a purpose of restoration processing to be executed. A value equivalent to a value defined in the backup purpose 603 set on the backup setting screen 11000 of the first embodiment is selected as a value defined in the restoration purpose 1903. The button 1904 is an interface for transmitting completion of input to the restoration execution screen 13000*a* and an input value to the restoration execution program 150.

<Restoration Execution Program>

The restoration execution program 150 is a process performed by being executed by the processor 161 of the management calculator 160, and is a process of searching for backup data that can be used according to the restoration purpose designated by the system administrator, and executing restoration processing according to input of the system administrator.

Figure 20:
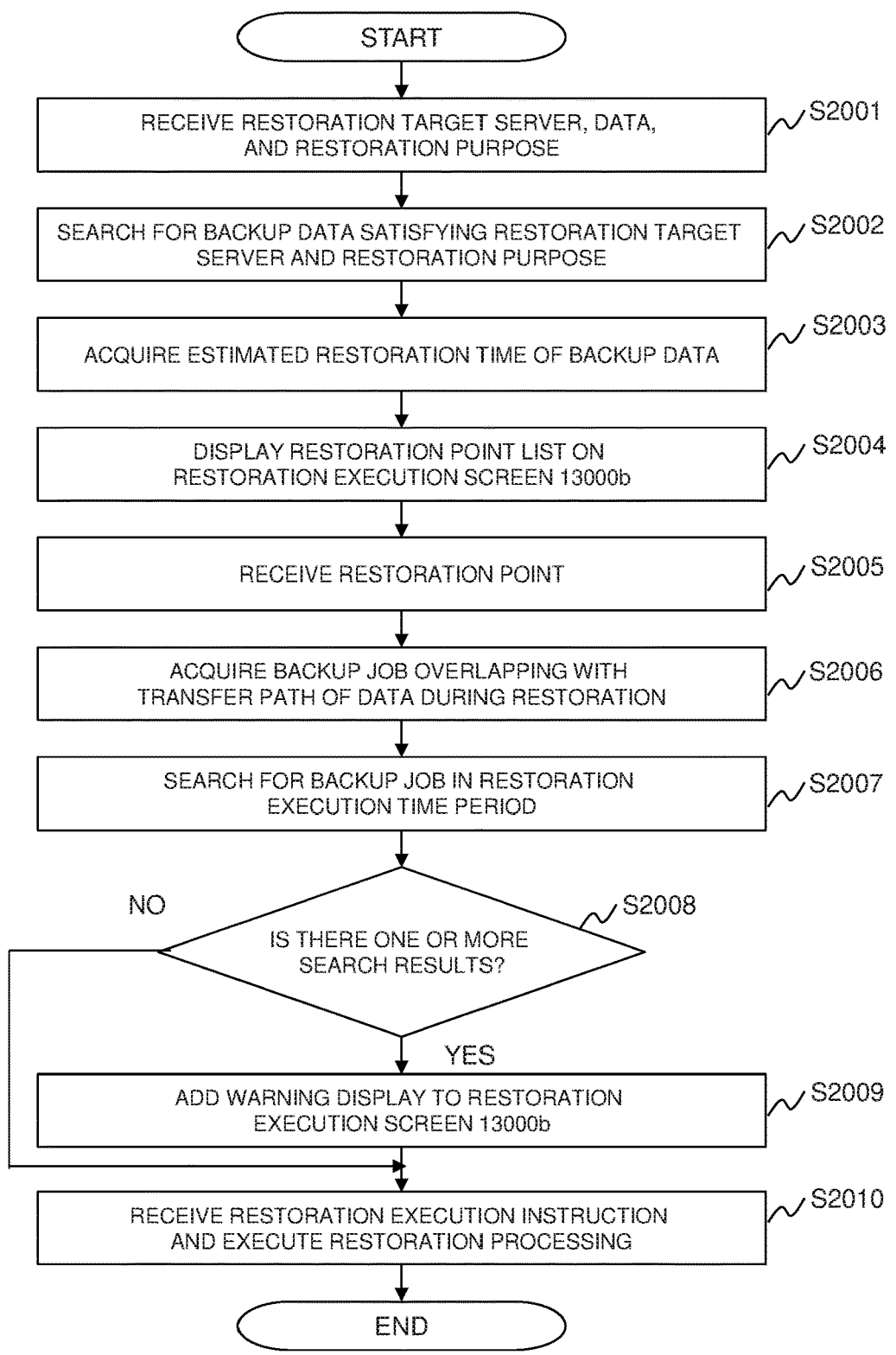
FIG. 20 is a flowchart of a restoration execution program according to the fourth embodiment.

FIG. 20 is a flowchart of restoration processing according to a fourth embodiment.

The restoration execution program 150 starts processing when, for example, setting information for executing restoration is input through the restoration execution screen 13000a and the button 1904 is pressed.

In step S2001, the restoration execution program 150 receives values of the restoration target server 1901 and the restoration purpose 1902 input on the restoration execution screen 13000a.

In step S2002, the restoration execution program 150 searches the backup data information 122 for an entry in which the restoration target server 1901 and the source server ID 1602 received are the same, the restoration target data 1902 and the source data ID 1603 received are the same, and the restoration purpose 1903 is included in the backup purpose 1605.

In step S2003, the restoration execution program 150 acquires an estimated restoration time for all the backup data acquired in step S2002. Referring to acquisition of the estimated restoration time, an estimated restoration time stored in the estimated restoration time 1408 of the backup data information 122 and corresponding to the received restoration purpose 1903 may be acquired. In addition, the restoration processing time varies depending on how much the backup data includes full backup data and incremental/differential backup data and whether performance of the restoration destination server is changed. Therefore, in step S2003, the restoration processing performance calculation program 142 may be called to calculate the estimated restoration time.

In step S2004, the restoration execution program 150 outputs the backup data information 122 acquired in step S2003 as a restoration point list to a restoration execution screen 13000b. The restoration execution screen 13000b will be described later.

In step S2005, the restoration execution program 150 receives a restoration point selected by the system administrator on the restoration execution screen 13000b.

In step S2006, the restoration execution program 150 acquires, from the backup job information 121, backup job information with which the data transfer path of the restoration destination business system server 201 overlaps from the backup repository 205 of the backup job data for the restoration point and the restoration purpose 1903 received. In the present embodiment, it is assumed that an arrangement of the repository destination business system server 202 is determined according to the restoration purpose. For example, in the case of addressing the logical fault, the same server as the restoration target server (that is, the backup target server) is used. In the case of addressing the storage fault, the same zone as the restoration target server (backup target server) is used. In the case of the zone fault, the same region and different zones are used for the restoration target server (backup target server). In the case of addressing the region fault, different regions are used for the restoration target server (backup target server). In the present embodiment, only the disk and the network I/F are targeted as the information of the component serving as the data transfer path. However, processors of the business system server 201 and the repository server 202, etc. may be targeted.

In step S2007, the restoration execution program 150 searches the backup job information 121 for backup job information to be executed during a restoration execution time period in the backup job information acquired in step S2006. When there is no input designating the restoration execution time, a restoration execution time period is set to, for example, an estimated restoration time period starting from a current time. An execution time period of the backup job is set to a time period of a value stored in the estimated backup completion time 1406 starting from a time of the schedule 1405.

In step S2008, the restoration execution program 150 determines whether or not there is one or more search results in step S2007. The restoration execution program 150 advances the processing to step S2009 when a result of this determination is true (S2009: YES), and advances the processing to step S2010 when the result of this determination is false (S2008: NO).

In step S2009, the restoration execution program 150 outputs a warning to the restoration execution screen 13000b to inform that there is a possibility that the performance of the restoration processing will be degraded since the backup job is executed during the restoration execution time period.

In step S2010, when the system administrator transmits a restoration execution instruction on the restoration execution screen 13000b, the restoration execution program 150 executes restoration processing on the management system target 200 based on the received input information on the restoration execution screen 13000a and the input information on the restoration execution screen 13000b.

<Restore Execution Screen 13000b>

FIG. 21 is a diagram illustrating an example of the restoration execution screen 13000b according to the fourth embodiment.

An input screen illustrated in FIG. 21 illustrates an example of the case of implementation using the GUI.

The restoration execution screen 13000b in the fourth embodiment is a screen on which the restoration execution program 150 outputs a restoration point list in step S2004, and is an input screen for the system administrator to select and input a restoration point to be used to execute restoration processing.

The restoration execution screen 13000b has a restoration point list display section 2100 that displays the backup data information acquired in step S2002 as a restoration point list, and a restoration execution button 2121. In addition, the restoration point list display section 2100 has a backup time 2101, a repository 2102, and an estimated restoration time 2103.

The backup time 2101 displays a time when the backup job completes backup processing, that is, a time of restorable data. The repository 2102 displays a repository in which the backup data is stored. The estimated restoration time 2103 displays an estimated restoration time when the restoration execution program 150 restores the backup data acquired in step S2003.

Restoration points displayed in the restoration point 2100 may be sorted and displayed in order of backup time values. The restoration points displayed in the restoration point 2100 may be sorted and displayed in order of estimated restoration time values. Alternatively, the restoration points displayed in the restoration point 2100 may be sorted in order of backup time values and then sorted in order of estimated restoration time values and displayed. In this way, it becomes easy for the system administrator to find a restoration point closest to a desired restoration time or a restoration point having an earliest restoration time.

Each one of the restoration points displayed in the restoration point list display section 2100 can be selected, and the restoration execution program 150 receives a selected result in step S2005.

When the system administrator presses the restoration execution button 2121, the restoration execution program 150 receives a restoration execution instruction and executes restoration processing.

As described above, according to the fourth embodiment, restoration processing can be executed according to the restoration purpose.

For example, as described with reference to FIGS. 20 and 21, etc., the processor of the management calculator 160, which is a computer having a processor and a memory, displays the restoration point based on the backup data information 122, which is information of backup data stored in the backup repository by the executed backup job, identification information of input restoration target data (for example, the restoration target server 1901 and the restoration target data 1902), and an input restoration purpose (for example, the restoration purpose 1903). In this way, the user of this system can select a restoration target according to the restoration purpose.

Further, as described in S2010 of FIG. 20, etc., the processor executes restoration based on the restoration point selected from among the restoration points, the identification information of the restoration target data, and the input restoration purpose. In this way, the user of this system can execute restoration processing for the selected and desired restoration target.

Further, as described in S2010 of FIG. 20, etc., the processor acquires and displays the estimated predetermined restoration processing time (for example, the processing time based on the trained model illustrated in FIG. 10) based on the backup data information 122, the input identification information of the restoration target data, and the input restoration purpose. In this way, the user of this system can easily select restoration processing according to the estimated restoration time.

In addition, as described in S2006 to S2009 of FIG. 20, etc., the processor searches for a backup job, a transfer path of which overlaps with the transfer path of the data to be restored, from the restoration point selected from among the restoration points, the identification information of the restoration target data, the input restoration purpose, and the backup job information 121 which is previously registered backup job setting information, and displays that the corresponding backup job is present. In this way, it is possible to detect presence of a backup job having the same transfer path or a possibility that performance of restoration processing will be degraded due to the backup job in advance.

Note that the invention is not limited to the above-described embodiments, and can be appropriately modified without departing from the scope of the invention.

For example, in the above embodiments, part or all of the processing performed by the processor may be performed by a dedicated hardware circuit. In addition, a program in the above embodiments may be installed from a program source. The program source may be a program distribution server or storage media (for example, portable storage media).

What is claimed is:

1. A backup management system for managing backup data by executing backup and restoration of a management target, comprising:
a computer having a processor and a memory,
wherein the processor:
calculates an arrangement combination of a backup repository satisfying an arrangement constraint rule based on business system configuration information which is information related to a configuration of a business system server included in the management target, backup repository configuration information which is information related to a configuration of a repository server for storing the backup data, input backup setting information, and the arrangement constraint rule for determining an arrangement of backup data according to a backup purpose;
estimates a processing time of predetermined backup for an arrangement of the backup repository;
estimates a processing time of predetermined restoration for an arrangement of the backup repository and a restoration purpose; and
derives a combination in which the processing time of the backup and the processing time of the restoration satisfy a target backup completion time and a target restoration processing time included in the input backup setting information among arrangement combinations of the backup repository.

2. The backup management system according to claim 1, wherein the processor displays a list of the arrangement combinations of the backup repository.

3. The backup management system according to claim 1, wherein the processor calculates and displays a resource that needs to be added among the arrangement combinations of the backup repository based on the business system configuration information and the backup repository configuration information.

4. The backup management system according to claim 1, wherein the processor calculates and displays costs that need to be added from a correlation of costs for a resource that needs to be added among the business system configuration information, the backup repository configuration information, and respective arrangement combinations of the backup repository.

5. The backup management system according to claim 1, wherein the processor sorts and displays the arrangement combinations of the backup repository in ascending order of costs that need to be added, in descending order of availability, or in order of evaluation of a combination thereof.

6. The backup management system according to claim 1, wherein the processor creates backup job information which is backup job setting information and executes a backup job based on a selected arrangement combination among the arrangement combinations of the backup repository.

7. The backup management system according to claim 3, wherein the processor changes a configuration of a management target based on a selected arrangement combination among the arrangement combinations of the backup repository and the resource that needs to be added.

8. The backup management system according to claim 1, wherein the processor calculates a load of a data transfer path in backup and restoration in the arrangement combinations of the backup repository from the business system configuration information, the backup repository configuration information, the arrangement combinations of the backup repository, and backup job information, which is previously registered backup job setting information, and calculates and displays a resource that needs to be added.

9. The backup management system according to claim 1, wherein the processor:

generates the business system configuration information based on the input backup setting information including setting information before construction of the business system server; and derives a combination in which the processing time of the backup and the processing time of the restoration satisfy the target backup completion time and the target restoration processing time included in the input backup setting information among the arrangement combinations of the backup repository.

10. The backup management system according to claim 6, wherein the processor displays a restoration point based on backup data information, which is information of backup data stored in the backup repository by the executed backup job, identification information of input restoration target data, and an input restoration purpose.

11. The backup management system according to claim 10, wherein the processor executes restoration based on the restoration point selected from among restoration points, the identification information of the restoration target data, and the input restoration purpose.

12. The backup management system according to claim 10, wherein the processor acquires and displays the estimated processing time of the predetermined restoration based on the backup data information, the identification information of the input restoration target data, and the input restoration purpose.

13. The backup management system according to claim 10, wherein the processor searches for a backup job, a transfer path of which overlaps with a transfer path of data to be restored, from the restoration point selected from among restoration points, the identification information of the input restoration target data, the input restoration purpose, and backup job information which is previously registered backup job setting information, and displays that a corresponding backup job is present.

14. A management calculator having a processor and a memory, the management calculator managing backup data by executing backup and restoration of a management target, wherein the processor:

calculates an arrangement combination of a backup repository satisfying an arrangement constraint rule based on business system configuration information which is information related to a configuration of a business system server included in the management target, backup repository configuration information which is information related to a configuration of a repository server for storing the backup data, input backup setting information, and the arrangement constraint rule for determining an arrangement of backup data according to a backup purpose;

estimates a processing time of predetermined backup for an arrangement of the backup repository;

estimates a processing time of predetermined restoration for an arrangement of the backup repository and a restoration purpose; and derives a combination in which the processing time of the backup and the processing time of the restoration satisfy a target backup completion time and a target restoration processing time included in the input backup setting information among arrangement combinations of the backup repository.

15. A non-transitory computer-readable recording medium causing a computer to execute processes of:

calculating an arrangement combination of a backup repository satisfying an arrangement constraint rule based on business system configuration information which is information related to a configuration of a business system server included in a management target, backup repository configuration information which is information related to a configuration of a repository server for storing backup data, input backup setting information, and the arrangement constraint rule for determining an arrangement of backup data according to a backup purpose;

estimating a processing time of predetermined backup for an arrangement of the backup repository;

estimating a processing time of predetermined restoration for an arrangement of the backup repository and a restoration purpose; and deriving a combination in which the processing time of the backup and the processing time of the restoration satisfy a target backup completion time and a target restoration processing time included in the input backup setting information among arrangement combinations of the backup repository.

\* \* \* \* \*